US012798903B2

(12) United States Patent
Michal

(10) Patent No.: US 12,798,903 B2
(45) Date of Patent: Nov. 17, 2026

(54) SYSTEMS AND METHODS FOR USE IN OBJECT PROCESSING USING DYNAMIC WHEEL ASSEMBLIES

(71) Applicant: Berkshire Grey Operating Company, Inc., Bedford, MA (US)

(72) Inventor: Joseph Corey Michal, Beverly, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 8 days.

(21) Appl. No.: 18/620,846

(22) Filed: Mar. 28, 2024

(65) Prior Publication Data

US 2024/0327145 A1 Oct. 3, 2024

Related U.S. Application Data

(60) Provisional application No. 63/562,970, filed on Mar. 8, 2024, provisional application No. 63/604,634, filed (Continued)

(51) Int. Cl.

*B25J 15/06* (2006.01)
*B25J 9/16* (2006.01)

(Continued)

(52) U.S. Cl.

CPC ......... *B25J 15/0683* (2013.01); *B25J 9/1664* (2013.01); *B65G 47/918* (2013.01); *B65G 67/20* (2013.01); *B65G 67/24* (2013.01)

(58) Field of Classification Search

CPC ... B25J 9/1664; B25J 15/0683; B65G 1/0492; B65G 1/065; B65G 47/918; B65G 67/20; B65G 67/24

(Continued)

(56) References Cited

U.S. PATENT DOCUMENTS 4,281,955 A * 8/1981 McWilliams ........ B65G 59/023 414/265
4,453,874 A 6/1984 Veldhuizen et al.

(Continued)

FOREIGN PATENT DOCUMENTS

CN 103332236 A 10/2013
DE 102013017617 A1 4/2015

(Continued)

OTHER PUBLICATIONS

US 2014/0205403 A1, Criswell, Jul. 24, 2014.*

(Continued)

*Primary Examiner* — Douglas A Hess
(74) *Attorney, Agent, or Firm* — Gesmer Updegrove LLP

(57) ABSTRACT

An object processing system is disclosed that includes a mobile system for moving from a proximal location toward a plurality of objects in a trailer of a tractor trailer, said mobile unit including at least one conveyor section for transporting any objects on the at least one conveyor section out of the trailer, the at least one conveyor section including a leading edge at a front of the mobile system as the mobile system moves toward the collection of objects in the trailer, and a pair of front wheel assemblies that each include a pair of wheels mounted on a frame that is pivotally attached to a chassis of the mobile system, wherein each wheel assembly includes a drive system that is also mounted on the frame such that the wheel assemblies are pivotable with respect to the chassis while being driven by the drive system.

46 Claims, 39 Drawing Sheets

Related U.S. Application Data on Nov. 30, 2023, provisional application No. 63/455,158, filed on Mar. 28, 2023.

(51) Int. Cl.

| | |
|---|---|
| ***B65G 47/91*** | (2006.01) |
| ***B65G 67/20*** | (2006.01) |
| ***B65G 67/24*** | (2006.01) |

(58) Field of Classification Search

USPC ........ 198/312, 313; 414/281, 346, 396, 406, 414/491

See application file for complete search history.

(56) References Cited

U.S. PATENT DOCUMENTS

| | | | | |
|---|---|---|---|---|
| 9,493,316 | B2 * | 11/2016 | Girtman | B65G 67/24 |
| 9,850,079 | B2 * | 12/2017 | Cyrulik | B65G 1/1373 |
| 10,336,562 | B2 * | 7/2019 | Girtman | B65G 67/26 |
| 11,667,476 | B1 | 6/2023 | Gil et al. | |
| 12,444,246 | B2 * | 10/2025 | Burns | G07C 5/02 |
| 12,473,146 | B2 * | 11/2025 | Zahdeh | B66F 9/0755 |
| 12,522,454 | B1 | 1/2026 | Dwivedi | |
| 2014/0028040 | A1 | 1/2014 | Oda | |
| 2018/0134501 | A1 | 5/2018 | Ge et al. | |
| 2018/0362270 | A1 | 12/2018 | Clucas et al. | |
| 2019/0084769 | A1 | 3/2019 | Clucas et al. | |
| 2020/0377317 | A1 | 12/2020 | Zoghzoghy et al. | |
| 2023/0045852 | A1 | 2/2023 | Guo | |
| 2023/0106508 | A1 | 4/2023 | Allen et al. | |
| 2024/0009833 | A1 | 1/2024 | Hoshi et al. | |
| 2024/0217761 | A1 | 7/2024 | Criswell et al. | |

FOREIGN PATENT DOCUMENTS

| | | | | |
|---|---|---|---|---|
| EP | 1855970 | B1 | 7/2009 | |
| EP | 2996973 | B1 | 1/2019 | |
| EP | 3800113 | A1 | 4/2021 | |
| EP | 3981718 | A1 | 4/2022 | |
| EP | 4067214 | A1 | 10/2022 | |
| EP | 4470949 | A1 | 12/2024 | |
| GB | 1038697 | A | 8/1966 | |
| JP | H05246549 | A | 9/1993 | |
| JP | H08165031 | A | 6/1996 | |
| JP | 2007222971 | A | 9/2007 | |
| JP | 2021126913 | A | 9/2021 | |
| WO | WO-2016033172 | A1 * | 3/2016 | B25J 9/1687 |
| WO | WO-2016066182 | A1 * | 5/2016 | B65G 1/0492 |
| WO | 2017060597 | A1 | 4/2017 | |
| WO | 2018053169 | A1 | 3/2018 | |
| WO | 2020209334 | A1 | 10/2020 | |
| WO | 2020221211 | A1 | 11/2020 | |
| WO | 2020262797 | A1 | 12/2020 | |
| WO | 2023028229 | A1 | 3/2023 | |

OTHER PUBLICATIONS

US 2014/0341695 A1, Girtman et al., Nov. 20, 2014.*

US 2015/0352721 A1, Wicks et al., Dec. 10, 2015.*

US 2023/0075455 A1, Azhdeh et al., Mar. 9, 2023.*

International Search Report and Written Opinion of the International Searching Authority, the European Patent Office, issued in related International Application No. PCT/US2024/022049 on Jun. 21, 2024, 11 pages.

International Search Report and Written Opinion of the International Searching Authority, the European Patent Office, issued in related International Application No. PCT/US2024/022058 on Jul. 8, 2024, 10 pages.

International Search Report and Written Opinion of the International Searching Authority, the European Patent Office, issued in related International Application No. PCT/US2024/022063 on Jun. 14, 2024, 10 pages.

International Preliminary Report on Patentability issued by the International Bureau of WIPO in related international application No. PCT/US2024/022058 on Sep. 20, 2025, 7 pages.

* cited by examiner

SYSTEMS AND METHODS FOR USE IN OBJECT PROCESSING USING DYNAMIC WHEEL ASSEMBLIES

PRIORITY

The present application claims priority to U.S. Provisional Patent Application No. 63/455,158 filed Mar. 28, 2023, U.S. Provisional Patent Application No. 63/604,634 filed Nov. 30, 2023, and U.S. Provisional Patent Application No. 63/562,970 filed Mar. 8, 2024, the disclosures of each of which is hereby incorporated by reference in its entirety.

BACKGROUND

The invention generally relates to automated, robotic and other object processing systems such as sortation systems, and relates in particular to automated and robotic systems intended for use in environments requiring, for example, that a variety of objects (e.g., parcels, packages, and articles, etc.) be processed and distributed to several output destinations.

Many parcel distribution systems receive parcels from a vehicle, such as a trailer of a tractor trailer. The parcels are unloaded and delivered to a processing station in a disorganized stream that may be provided as individual parcels or parcels aggregated in groups such as in bags, and may be provided to any of several different conveyances, such as a conveyor, or one or more pallets, Gaylords, or bins. Each parcel must then be distributed to the correct destination container, as determined by identification information associated with the parcel, which is commonly determined by a label printed on the parcel or on a sticker applied to the parcel. The destination container may take many forms, such as a bag or a bin.

The sortation of such parcels from the vehicle has traditionally been done, at least in part, by human workers that unload the vehicle, then scan the parcels, e.g., with a hand-held barcode scanner, and then place the parcels at assigned locations. For example, many order fulfillment operations achieve high efficiency by employing a process called wave picking. In wave picking, orders are picked from warehouse shelves and placed at locations (e.g., into bins) containing multiple orders that are sorted downstream. At the sorting stage individual articles are identified, and multi-article orders are consolidated, for example into a single bin or shelf location, so that they may be packed and then shipped to customers. The process of sorting these objects has traditionally been done by hand. A human sorter picks an object from an incoming bin, finds a barcode on the object, scans the barcode with a handheld barcode scanner, determines from the scanned barcode the appropriate bin or shelf location for the object, and then places the object in the so-determined bin or shelf location where all objects for that order have been defined to belong. Automated systems for order fulfillment have also been proposed, but such systems still require that objects be first removed from a vehicle for processing if they arrive by vehicle.

Such systems do not therefore, adequately account for the overall process in which objects are first delivered to and provided at a processing station by a vehicle such as a trailer of a tractor trailer. Unloading trailers by human personnel, e.g., into Gaylords or large bins, takes considerable time. Additionally, many processing stations at which the Gaylords or large bins are received are at times, at or near full capacity in terms of available floor space and sortation resources. There is a further need therefore for systems to unload vehicles and efficiently and effectively provide a more ordered flow of objects for processing.

SUMMARY

In accordance with an aspect, the invention provides an object processing system that includes a mobile system for moving from a proximal location toward a plurality of objects in a trailer of a tractor trailer, said mobile unit including at least one conveyor section for transporting any objects on the at least one conveyor section out of the trailer, the at least one conveyor section including a leading edge at a front of the mobile system as the mobile system moves toward the collection of objects in the trailer, and a pair of front wheel assemblies that each include a pair of wheels mounted on a frame that is pivotally attached to a chassis of the mobile system, wherein each wheel assembly includes a drive system that is also mounted on the frame such that the wheel assemblies are pivotable with respect to the chassis while being driven by the drive system.

In accordance with another aspect, the invention provides an object processing system that includes a mobile system for moving from a proximal location toward a plurality of objects in a trailer of a tractor trailer, said mobile unit including at least one conveyor section for transporting any objects on the at least one conveyor section out of the trailer, the at least one conveyor section including a leading edge at a front of the mobile system as the mobile system moves toward the collection of objects in the trailer, and a pair of front wheel assemblies that each pivot about a front wheel axes that is generally transverse to a direction of movement of the front wheel assemblies, and a rear wheel assembly that pivots about a rear wheel axis that is generally parallel to the direction of movement of the front wheel assemblies.

In accordance with a further aspect, the invention provides a method of processing object that includes moving a mobile unit from a proximal location toward a plurality of objects in a trailer of a tractor trailer along a first direction, said mobile unit including at least one conveyor section for transporting any objects on the at least one conveyor section out of the trailer, the at least one conveyor section including a leading edge at a front of the mobile unit as the mobile unit moves toward the collection of objects in the trailer, pivoting a pair of front wheel assemblies, each front wheel assembly being pivotable about an axis that is generally transverse to the first direction, and pivoting a rear wheel assembly about an axis that is generally parallel with the first direction.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
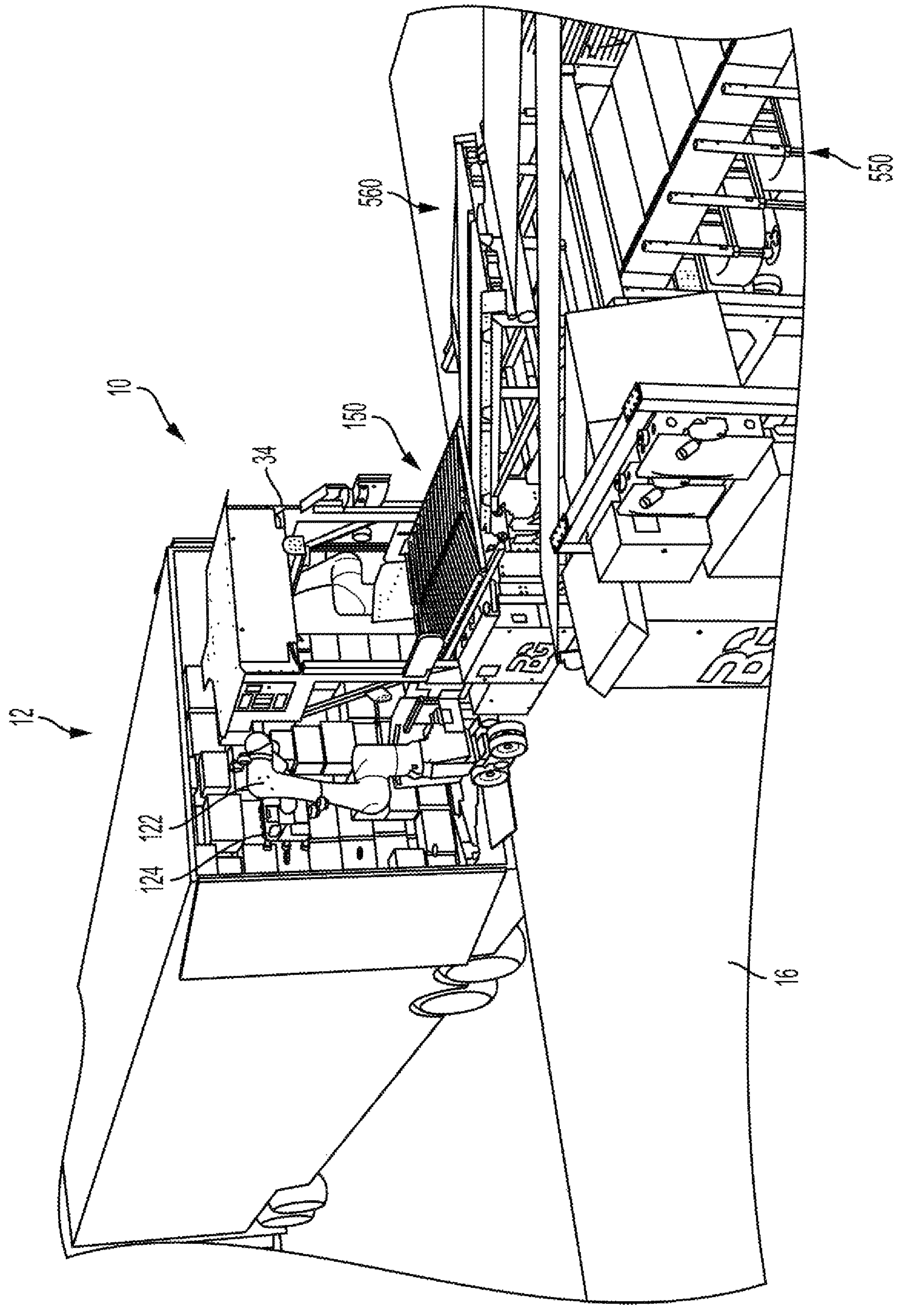
FIG. 1 shows an illustrative diagrammatic rear view of an object processing system in accordance with an aspect of the present invention that includes a mobile system for unloading a trailer of a tractor trailer.
Figure 2:
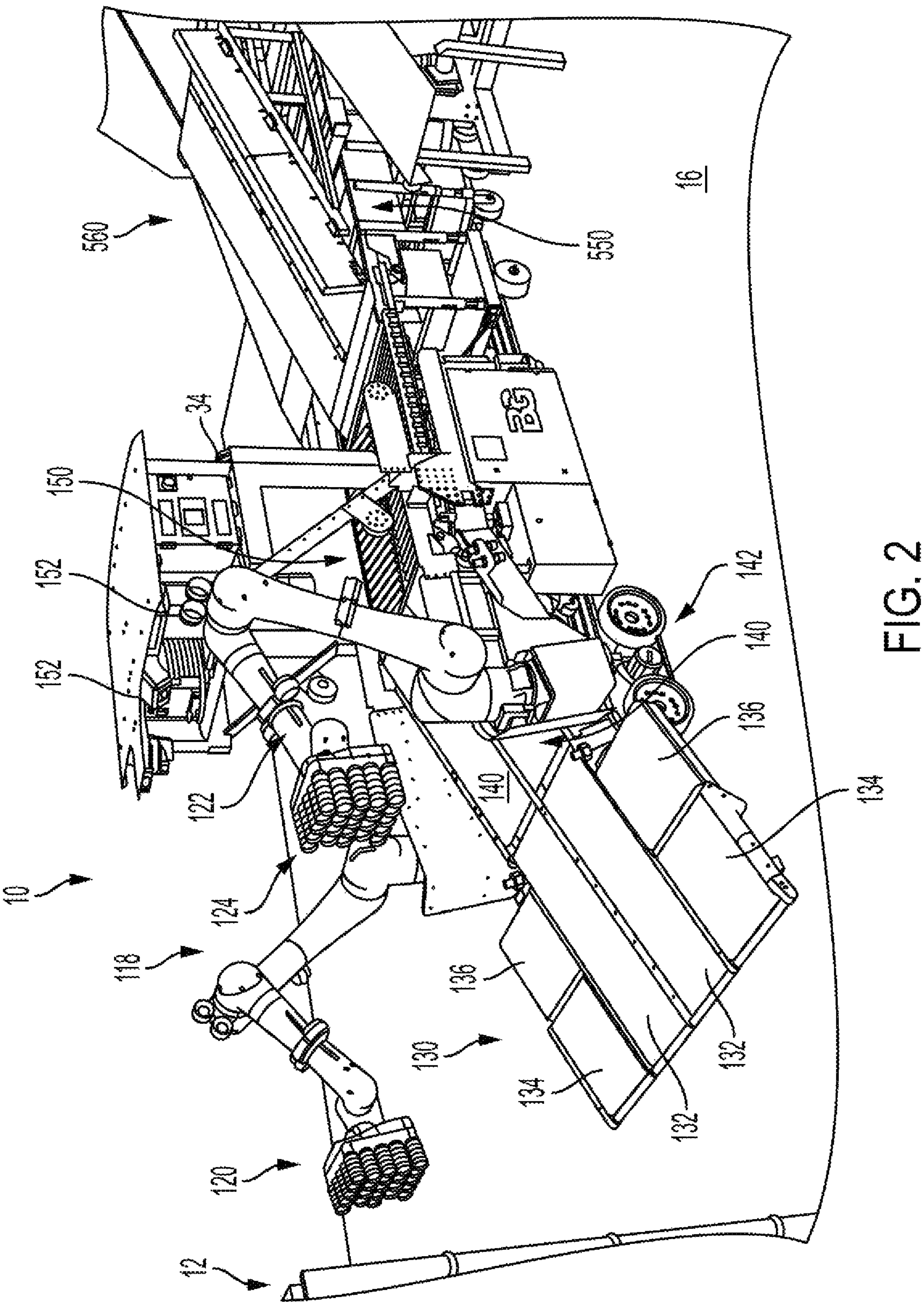
FIG. 2 shows an illustrative diagrammatic front view of the object processing system of FIG. 1.

In accordance with various aspects and with reference to FIGS. 1 and 2, the invention provides an object processing system 10 that processes a collection of objects within a trailer 12 of a tractor trailer on a loading dock 16 and provides the objects via a transition conveyor 150 to a receiving conveyor 550 that may be positioned, for example, below a collection conveyor 560 of a facility for receiving the objects. The collection conveyor 560 receives the objects from the receiving conveyor 550. The object processing system 10 includes a programmable motion device 122 with an end-effector 124.

The mobile system 10 is coupled to the receiving conveyor 550 for providing the objects to the receiving conveyor 550 as the mobile system 10 and receiving conveyor 550 are moved into the trailer 12. The mobile system 10 (together with the programmable motion device and the receiving conveyor 550 drawn behind it) may be moved into and out of the trailer 12 using one or more mobile unit motors 142. As the mobile system 10 is moved into the trailer, the perception systems 152 (shown in FIG. 2) provide perception information (e.g., depth perception data, 2D or 3D scan data and/or camera image data) to assist in guiding the mobile unit 25 into the trailer.

Figure 3:
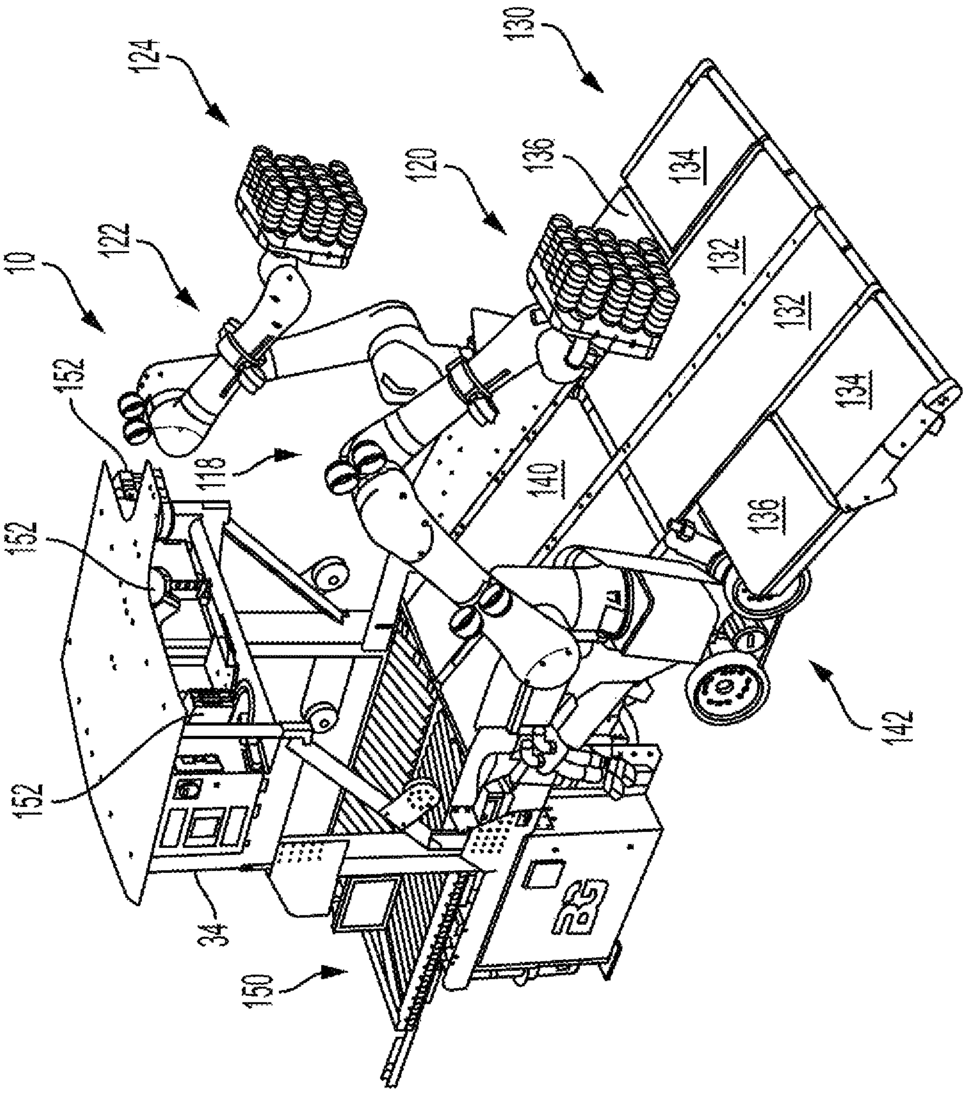
FIG. 3 shows an illustrative diagrammatic view of the mobile system of the object processing system of FIG. 1.

In accordance with certain aspects, the system may include a plurality of programmable motion devices and one or more kicker rollers. For example, FIG. 3 shows an object processing system 10 that includes a structure 34 that includes two programmable motion devices 118, 122 as well as one or more computer processing system (such as computer processing system 100 shown in FIG. 4) and a high flow vacuum source (e.g., the high flow vacuum sources shown in FIG. 37). Both programmable motion devices may include the same type of end-effector (e.g., two end-effectors 120, 124 as discussed above) or may include different types of end-effectors. As shown in FIG. 3, the programmable motion device 118 includes an end-effector 120 with an array of vacuum cups, and the programmable motion device 122 includes an end-effector 124 with a series of actuating conveyor sections. Each of the programmable motion devices 118, 122 may move their respective end-effector about the space within the trailer to reach objects within the trailer and dislodge them onto either the trailer floor or onto the loading portion 130. The loading portion 130 includes a plurality of conveyor sections 132, 134, 136, and the loading sections 132, 134 each include a lead kicker roller 138 and 139. The kicker rollers directly contact any objects on the trailer floor and facilitate moving objects on the floor onto the loading portion 130. The conveyor sections 132, 134 provide movement toward a collecting conveyor 140, which leads to a transition conveyor 150 for coupling to a side conveyance system. The kicker rollers 138, 139 may each be differently or independently driven with respect to the conveyor sections 132, 134 as discussed below with reference to FIGS. 34, 35. Perception systems 152 may also be employed to provide perception data regarding, for example, the proximity of a stack or pile of objects within the trailer.

Figure 4:
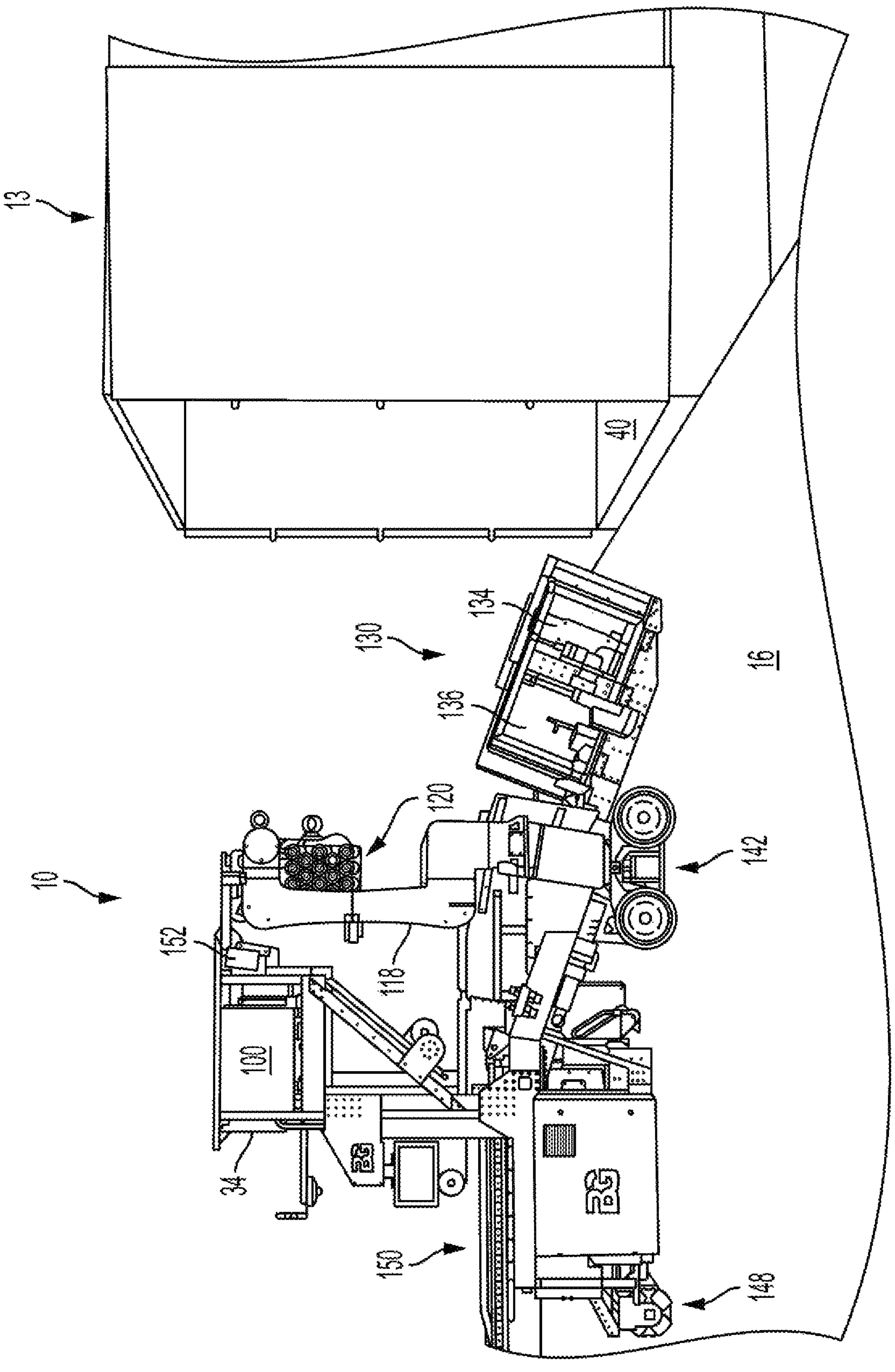
FIG. 4 shows an illustrative diagrammatic view of the object processing system of FIG. 3 showing the mobile system entering a trailer of a tractor trailer.
Figure 5:
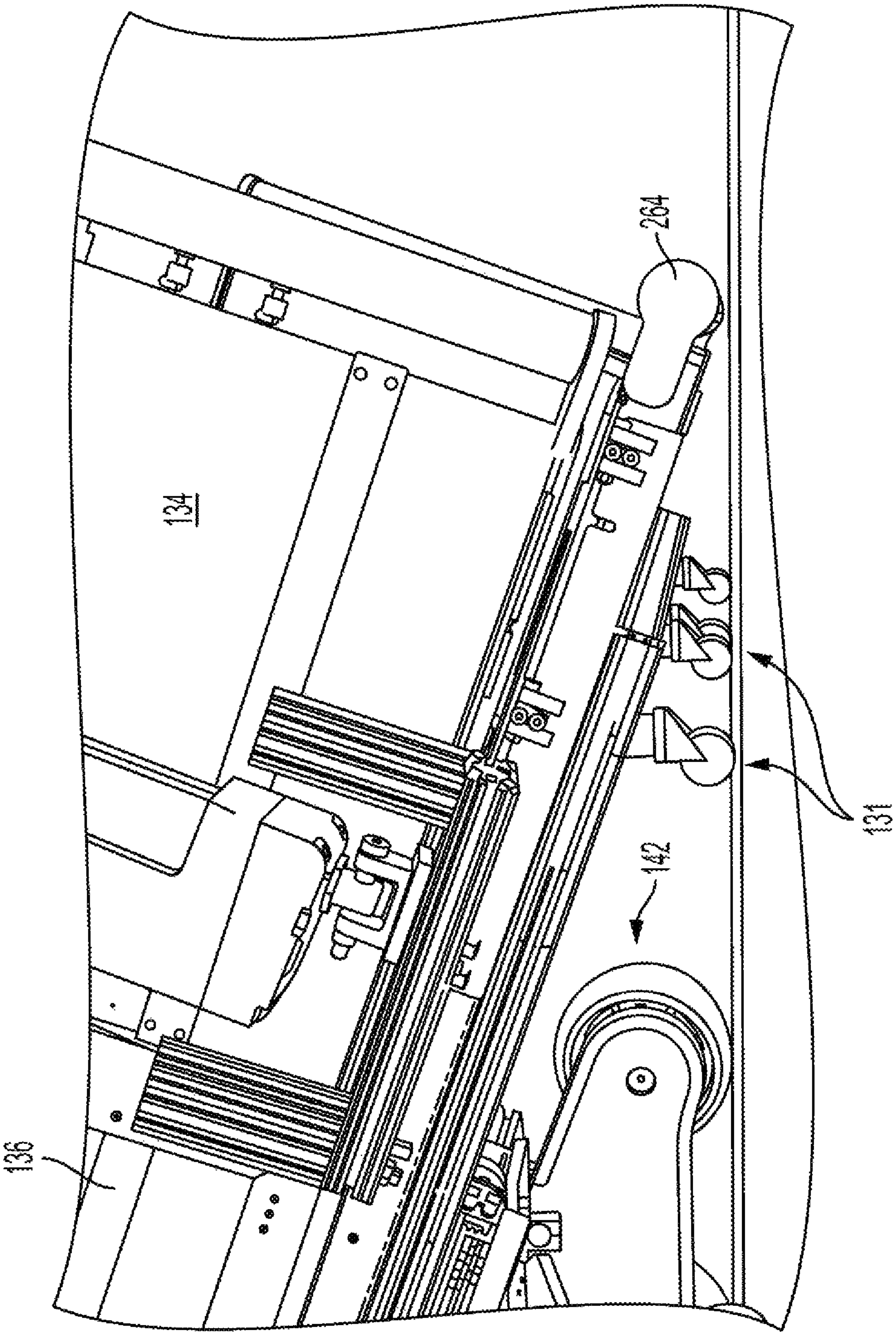
FIG. 5 shows illustrative diagrammatic view of the object processing system of FIG. 3 showing an enlarged view of an aspect of the underside of the object processing system.
Figure 6:
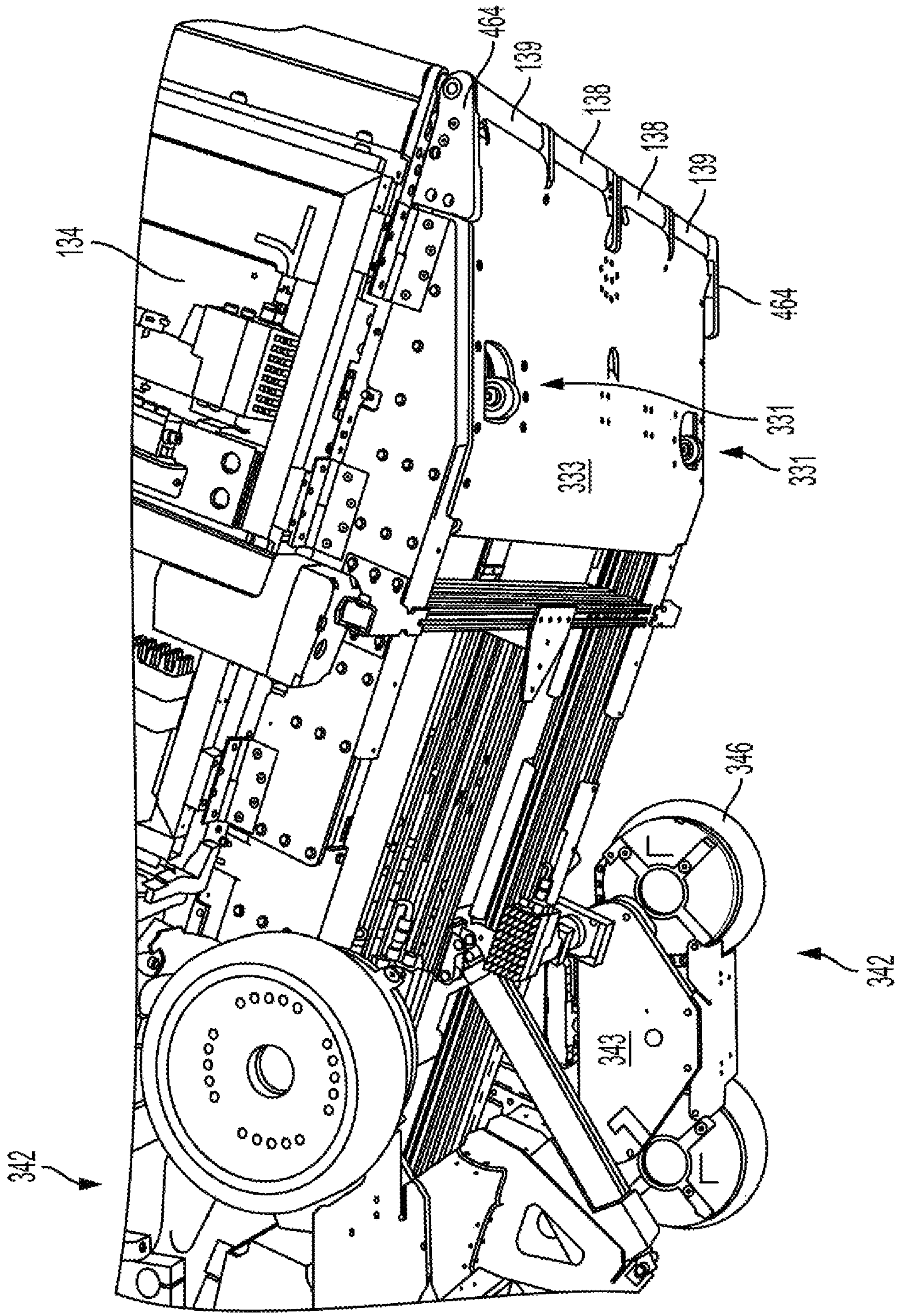
FIG. 6 shows an illustrative diagrammatic view of an object processing system of FIG. 3 showing an enlarged view of another aspect of the underside of the object processing system.

FIG. 4 shows a side view of the object processing system 10 about to enter a trailer 12 of a tractor trailer. The conveyor sections 134, 136 may be lifted along their sides adjacent the conveyor sections 132 (shown in FIG. 3) to facilitate entering the trailer, and the loading portion 130 may be slightly elevated to protect the kicker roller 138 as the system 10 enters the trailer 12. The system 10 further includes two front drive wheel systems 142 as well as two rear steering wheel systems 148. Although simple castors (passive wheels) could be used in accordance with certain aspects of the invention, the use of active rear steering wheels (e.g., 148) may facilitate maintaining alignment of the object processing system within the trailer. The respective elevations of the loading dock 16 and the floor 40 of the trailer may differ, and a small distance may separate the loading dock 16 and the floor 40. If a ramp or temporary threshold is provided bridging the loading dock and the floor, the two front drive wheel systems 142 may still facilitate moving the object processing system onto and over the ramp or temporary threshold. FIG. 5 shows an enlarged view of the underside of the system 10 showing support caster wheels 131 on the underside of the conveyor sections 132 (shown in FIG. 3). FIG. 6 shows an underside view of an object processing system in accordance with a further aspect of the present invention that includes front wheel assemblies 342 with wheels 346 mounted to wheel frames 343, as well as casters 331 within wells of a shield 333 adjacent kicker rollers 138, 139 mounted to kicker roller supports 464.

Figure 7A:
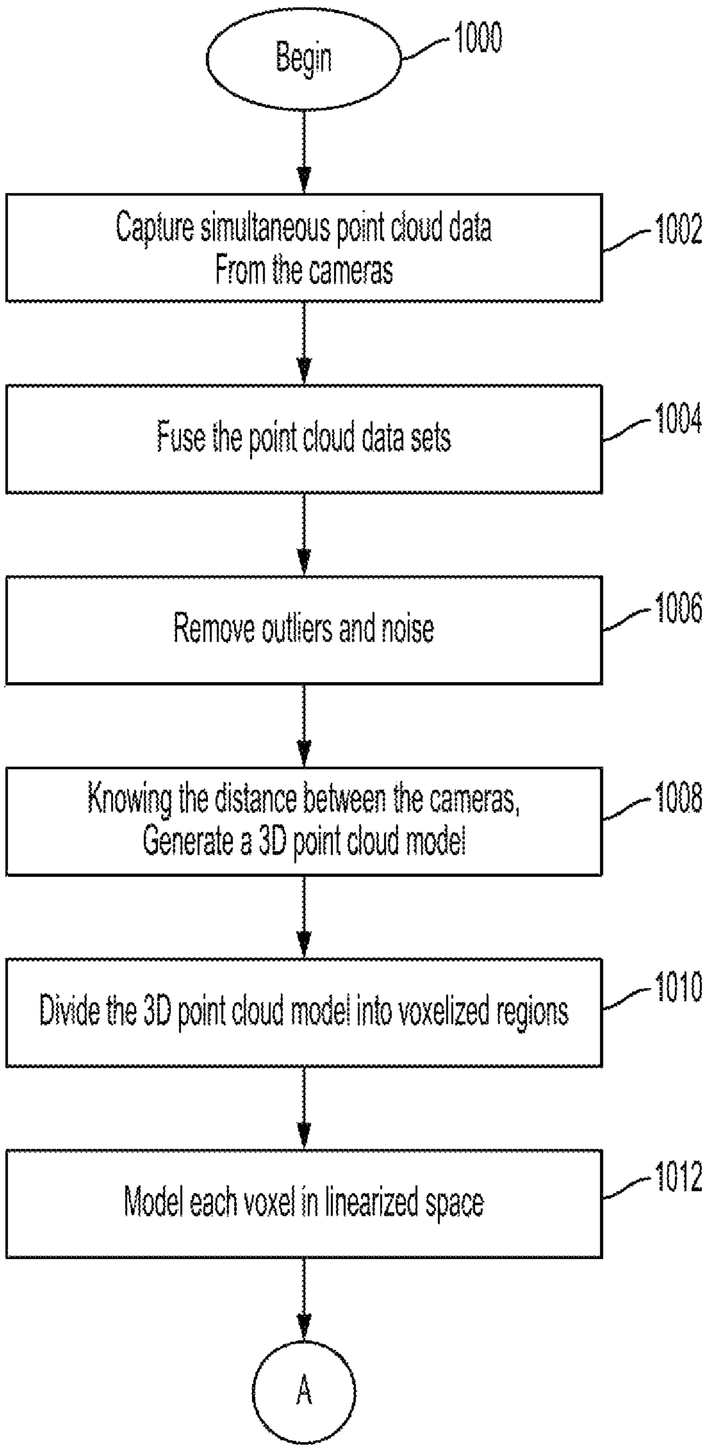
FIGS. 7A and 7B show illustrative functional views of perception processing steps in an object processing system in accordance with an aspect of the present invention.
Figure 7B:
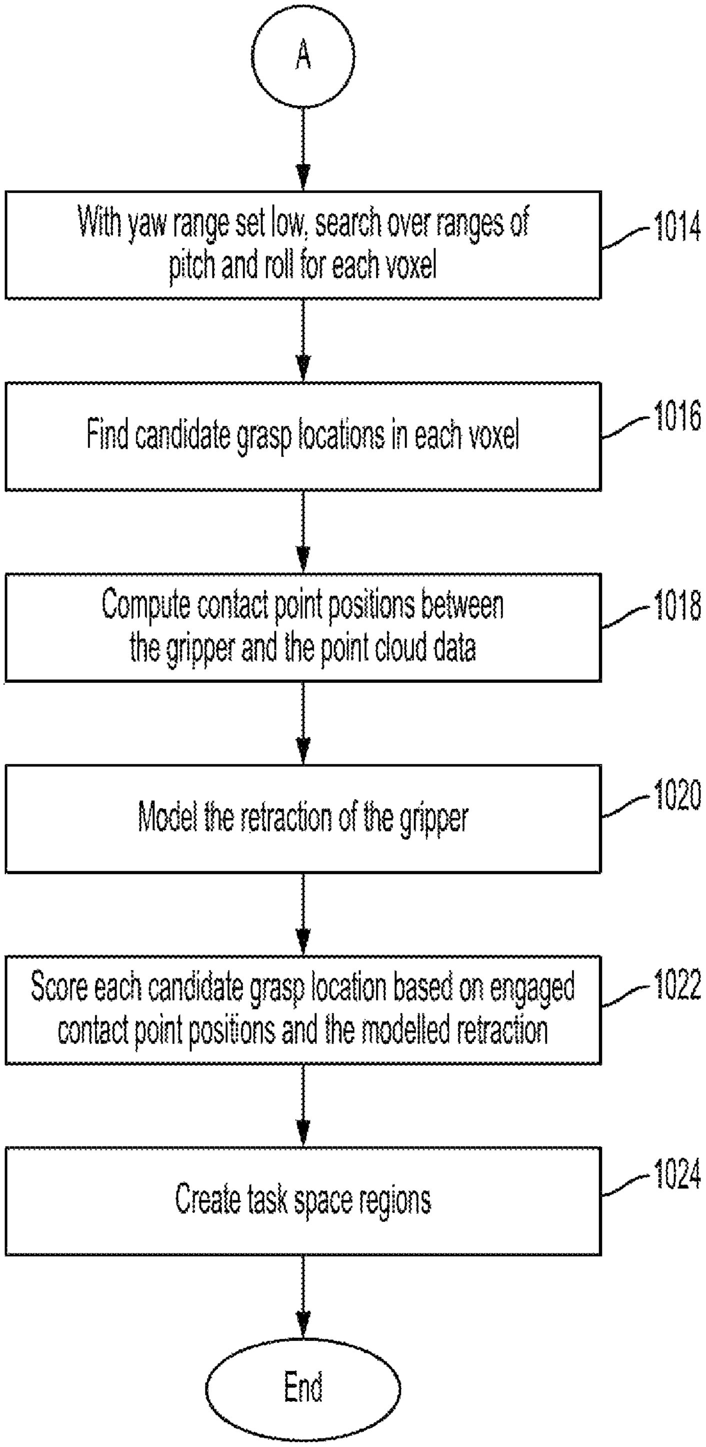

The object processing systems disclosed herein may employ a variety of perception systems and perception methodologies. For example and with reference to FIGS. 7A and 7B, the system may involve engaging a plurality (e.g., three) perception units 152 (e.g., machine vision smart cameras) mounted above the workspace of the programmable motion devices (shown in FIG. 3). Each of the perception units 152 may capture colorized point cloud data, and each of the perception units is calibrated and positioned at a known location and spacing. The use of two or more such perception units provides unique angles to show three-dimensional nature of the point cloud data. The process may begin (step 1000) by capturing simultaneous point cloud data using the perception units 152 (step 1002). The point cloud data sets are then fused (step 1004) and points outside of the region of interest are removed. The system then removes data associated with noise (radius and statistical outlier removal) (step 1006).

The system will then seek to maximize contact between edges of cups and objects by scoring candidate grasp locations. The system will also seek to prevent grasp locations that are too close together by only including a finite number of grasp locations within voxelized regions of the workspace. In particular, knowing the distance between the perception units 152, the system will generate a 3D point cloud model (step 1008) and then divide the 3D point cloud model into voxelized regions (step 1010). The system will then search linearized space, finding the best grasp locations in each voxel. In particular, the system will model each voxel in linearized space (step 1012) and then search over explicit ranges of pitch and roll (with a yaw range set low (e.g., to zero) (step 1014).

Figure 19:
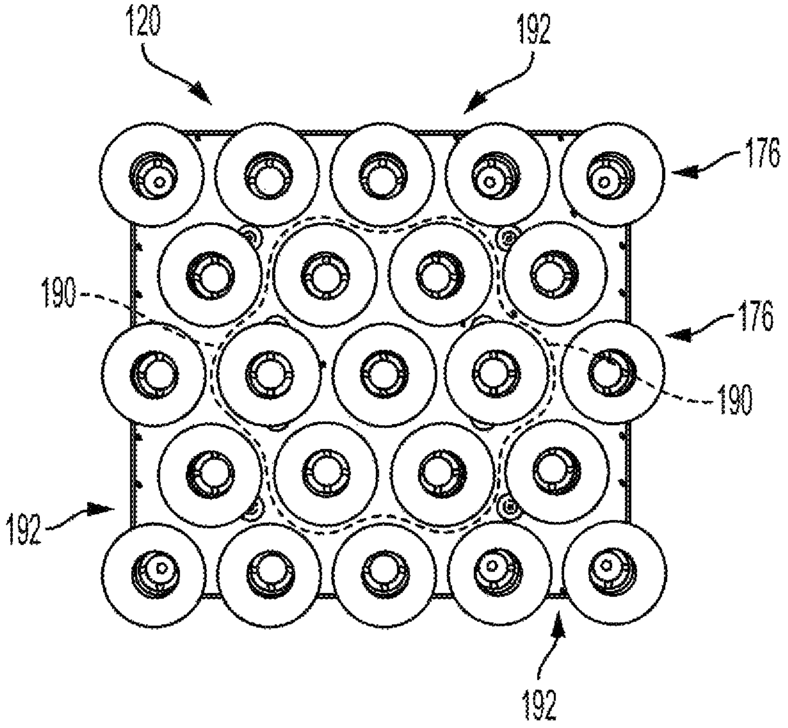
FIG. 19 shows an illustrative diagrammatic view of portions of the vacuum end-effector system of FIG. 16A and FIG. 16B showing a front view of the vacuum cup array.

The system will then find candidate grasp locations in each voxel (step 1016) and then compute contact point positions between the gripper and the point cloud data (step 1018). The retraction of the gripper is then modelled (step 1020) omitting grasps where the gripper exits the region of interest and where the object is too close to an obstruction etc.). The system will then score each candidate grasp location based on engaged contact point positions and the modelled retraction of the gripper (step 1022). The system will then create task space regions (step 1024) prior to ending (step 1026) the iteration. With reference to FIG. 19, the gripper may include an array of vacuum cups that are provided in two or more zones 190, 192. Each zone may be differently modelled in providing the modelled retraction of the gripper such that, for example, vacuum cups in the zone 190 may have a higher scoring value (e.g., 3 or 4) as compared to the vacuum cups in the zone 192 (e.g., 1 or 2). In this way, a portion (such as the center) of the vacuum cup array may be favored in developing grasp locations. The grasp locations may be pull locations on surfaces of objects that are facing the mobile system, and may be pick locations on exposed top surfaces of the objects.

Figure 8A:
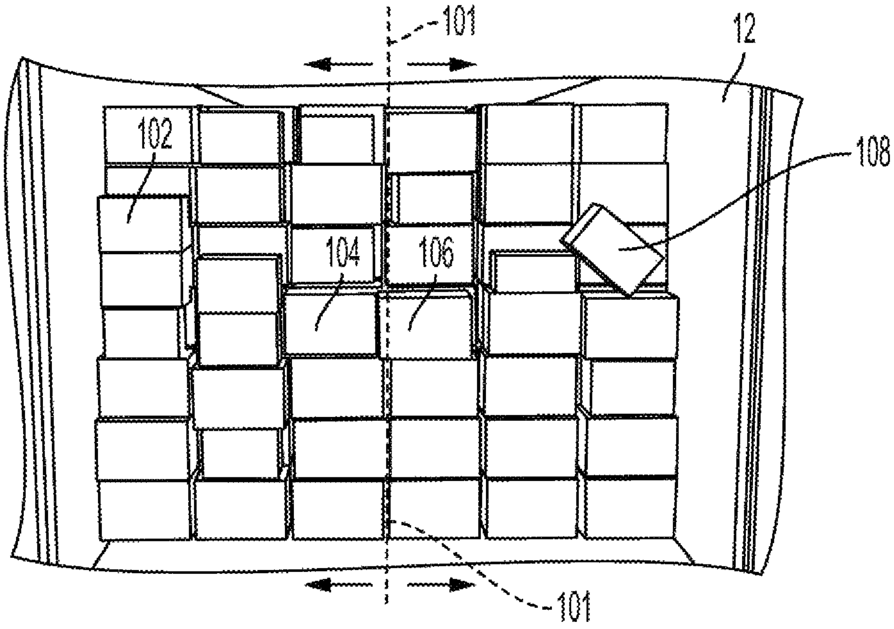
FIGS. 8A and 8B show illustrative diagrammatic views of partitioning systems in accordance with an aspect of the present invention showing a vertically uniform partitioning (FIG. 8A) and showing a vertically varied partitioning (FIG. 8B)
Figure 8B:
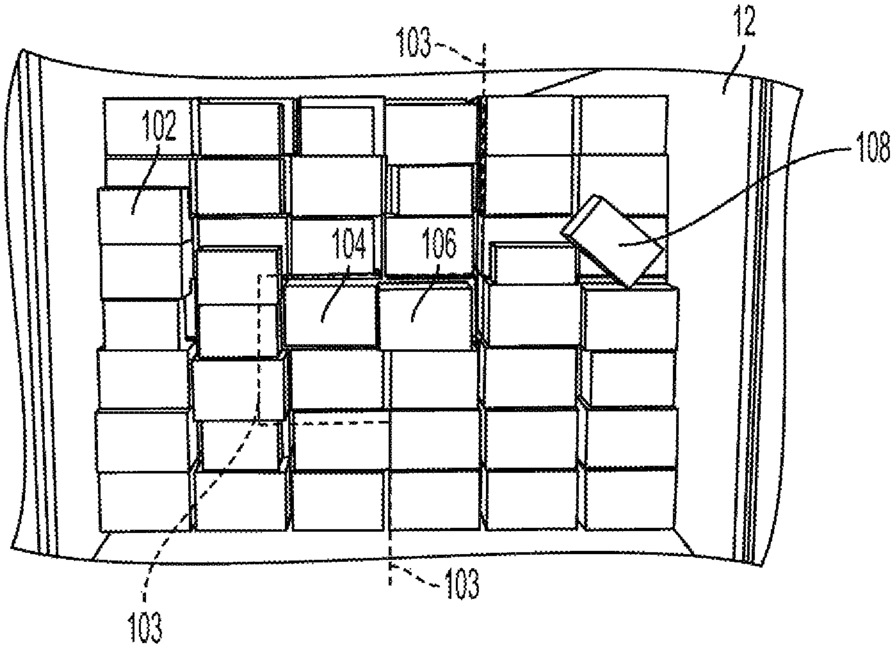

When the grasp (pull) locations (e.g., 102, 104, 106, 108) are determined, the system may apportion the full region of objects within the trailer 12 into partitioned regions as shown in FIGS. 8A and 8B where two end-effectors are used. In particular, FIG. 8A shows a partition 101 that is vertically uniform such that grasp locations 102 and 104 are in one region and grasp locations 106 and 508 are in the other region. The partition 101 may be varied as objects are being removed (for example, if more objects or heavier objects are on one side of the trailer). FIG. 8B shows a partition 103 that varies in the vertical direction such that grasp location 102 lies in one partitioned region while grasp locations 104, 106, 108 lie in the other partitioned region. Again, the partition 103 may be varied dynamically as objects are being removed for a variety of reasons such as weight of objects, volume of objects and the presence of an object that cannot be processed (an exception).

Figure 9:
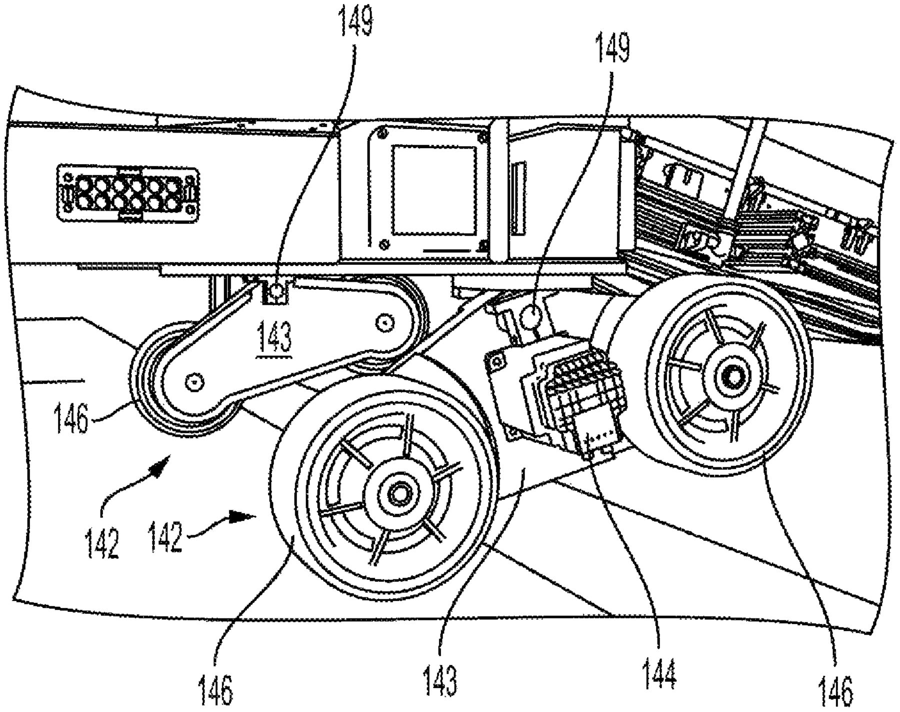
FIG. 9 shows an illustrative diagrammatic view of a front wheel drive system of a mobile system of the object processing system of FIG. 3.
Figure 11A:
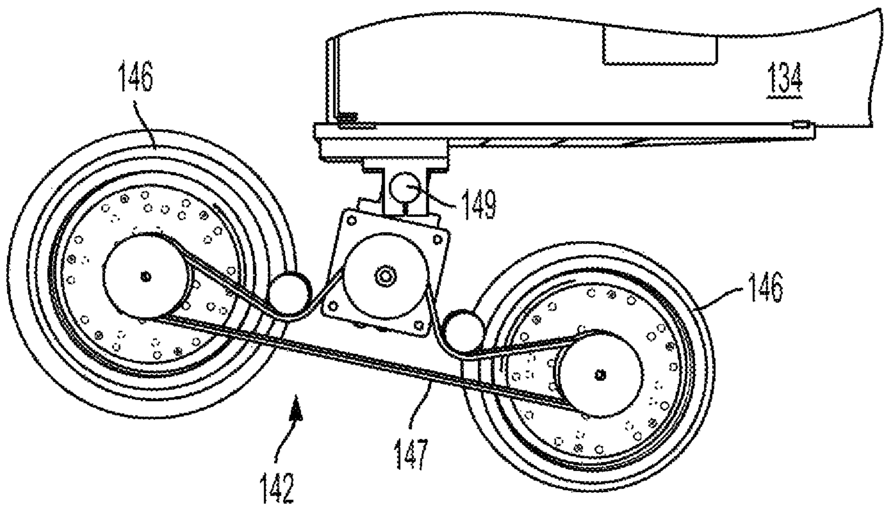
FIGS. 11A and 11B show illustrative diagrammatic views of the front wheel drive system of FIG. 9 showing a front wheel assembly rocked in a first rotated position (FIG. 11A) and docked in a second rotated position (FIG. 11B)
Figure 11B:
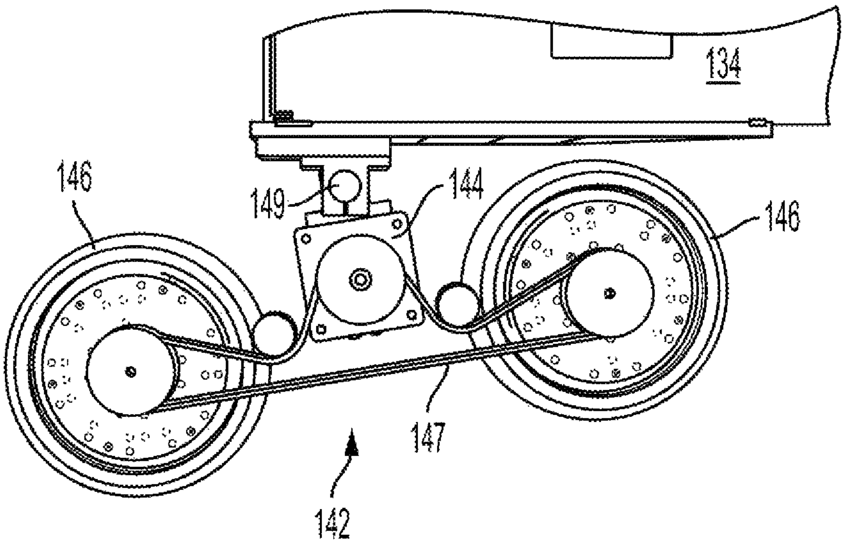

With further reference to FIG. 9, each front drive wheel system 142 includes a pivotable frame 143 that includes a motor 144 and two driven wheels 146. FIGS. 11A and 11B show a front drive wheel assembly (with the frame removed for clarity) showing each wheel 146 being drive via a belt 147 by the motor 144. The pivoting of the wheel system 142 about the pivot pin 149 is independent of the application of power to the wheels 146 by the motor 144. This permits each wheel system 142 to accommodate gaps and differences in elevations as the object processing system 10 enters and exits the trailer.

Figure 10:
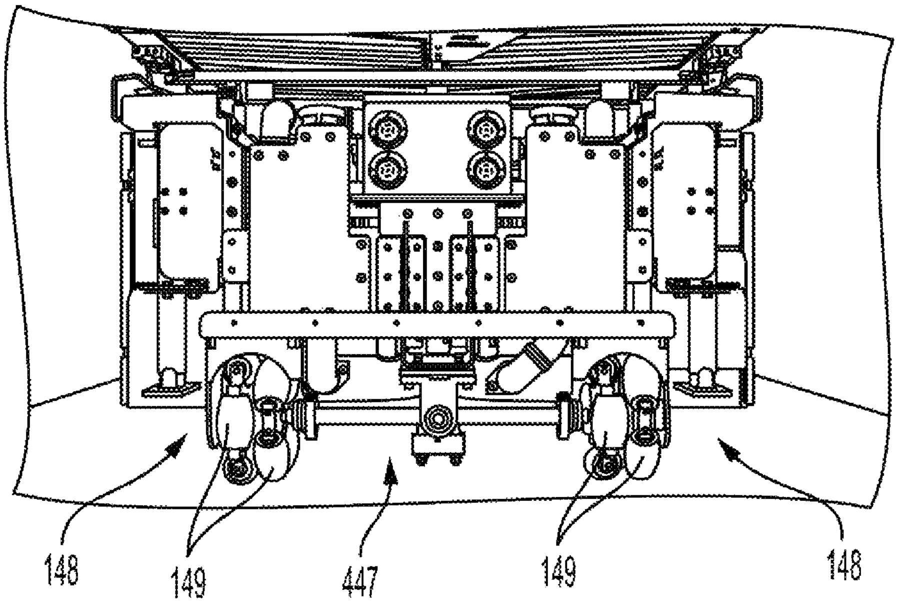
FIG. 10 shows an illustrative diagrammatic view of a rear wheel steering system of the mobile system of FIG. 3.
Figure 12:
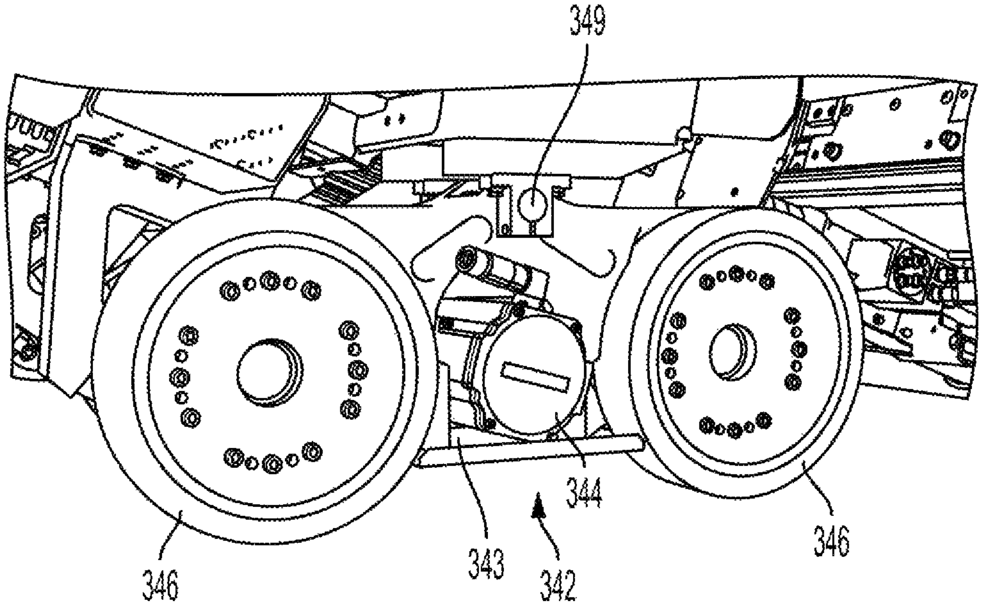
FIG. 12 shows an illustrative diagrammatic outer view of a front wheel drive system of FIG. 9 showing a front wheel assembly of another aspect of the present invention.
Figure 13:
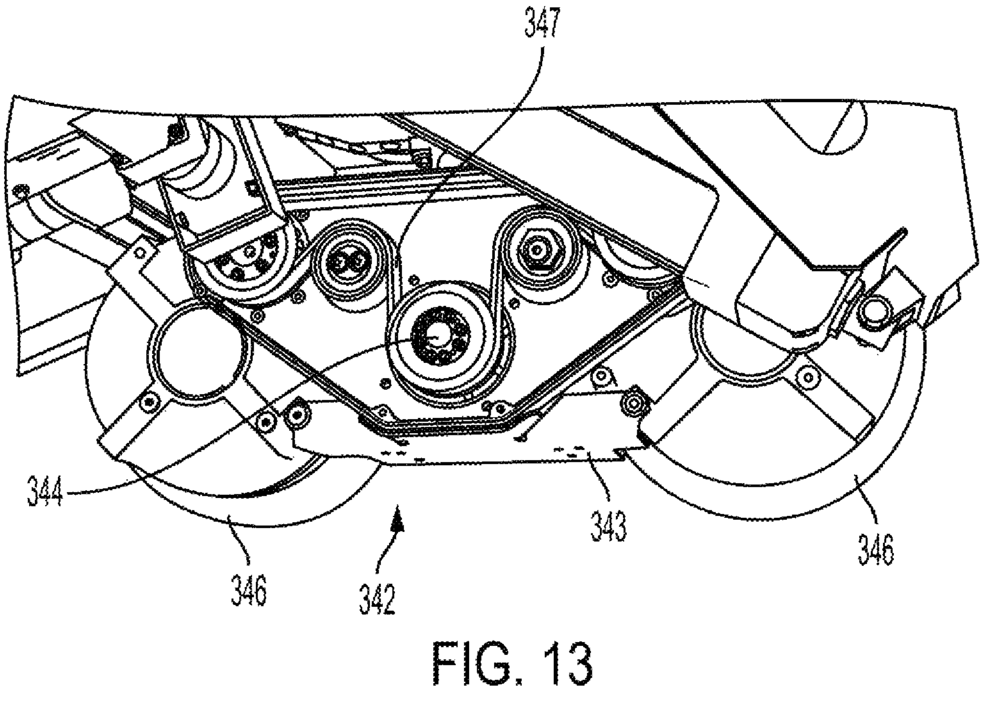
FIG. 13 shows an illustrative diagrammatic inner view of the front wheel drive system of FIG. 12.

FIG. 10 shows the rear steering wheel systems 148 that may be powered, each of which includes activatable transverse rollers 149 permitting the wheel systems to actively steer the rear wheels as the system enters and moves within the trailer. Maintaining the unloading system equidistant between the inner side walls of the trailer may be important not only for efficiently gathering objects, but also for deployment of the conveyor sections 134 and 136 as well as to permit access by human personnel (by being rotated upward to permit access) as discussed herein. FIGS. 11A and 11B show that the front wheel systems 142 engage the drive motor 144 with the wheels 146 via the belt 147 regardless of a rotational position of the front wheel systems 142 with respect to the frame 134 via the pivoting mount 149. FIG. 11A shows a front wheel system with the wheel 146 under the frame pivoted downward under the frame 134 and FIG. 11B shows the front wheel system with the wheel 146 under the frame pivoted upward under the frame 134. FIGS. 12 and 13 shows front wheel assemblies 342 in accordance with a further aspect of the present invention that includes wheels 346 mounted on wheel frames 343 that are each pivotable about an axis 349, and may be driven while pivoted by a belt 347 via a motor 344.

Figure 14:
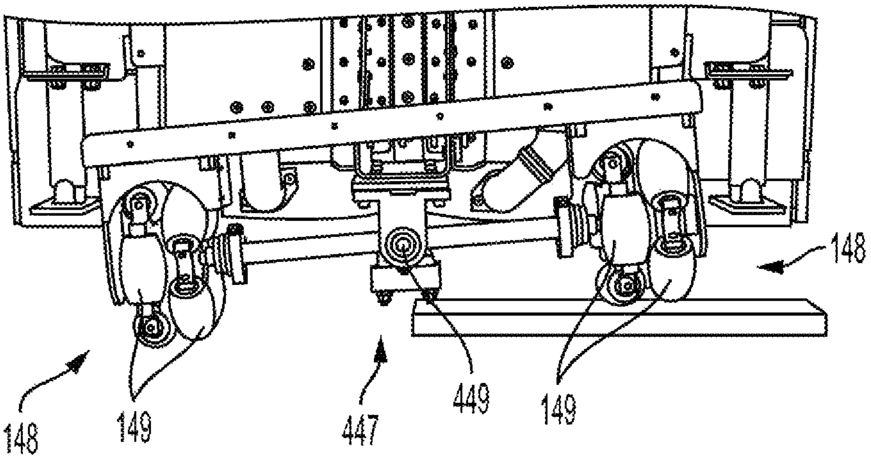
FIG. 14 shows an illustrative diagrammatic view of the rear wheel system of FIG. 10 showing the rear wheel system accommodating debris in a trailer.

FIG. 14 shows the rear steering assembly 447 of FIG. 10 engaging debris in a trailer, showing the rear steering assembly 447 may rotate about an axis 449. Note that the axis of pivot 449 is transverse to the axis of pivot each of the wheel assemblies 142, 342, although the direction of travel of the wheels 146, 148, 346 are generally the same (wheels 148 are multi-directional wheels). The system permits the rear to steer while accommodating irregularities in the surface of travel using pivoting wheel assemblies that pivot in mutually orthogonal directions.

Figure 15:
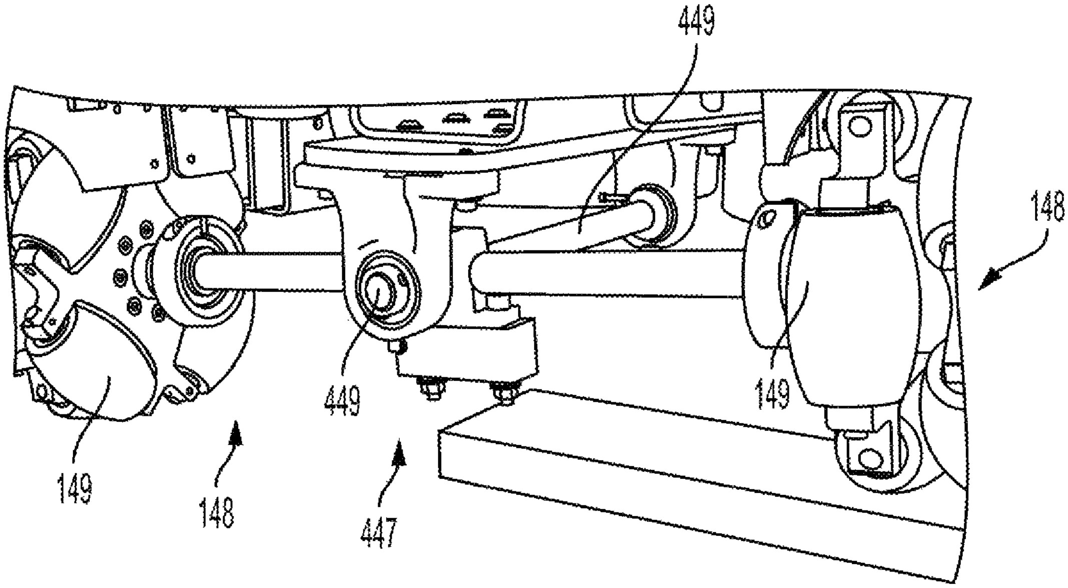
FIG. 15 shows an illustrative diagrammatic side view of the rear wheel system of FIG. 14.

With reference to FIG. 15, the object processing system 10 may remain aligned within the trailer by using multi-directional wheel systems 148 that provide rotation in the direction of the wheel system 142 as well as movement transverse to the direction of movement of wheel system 142 through actuation of cross-direction rollers 149. The steering provided by the multi-directional wheel systems 148 may be particularly helpful when exiting the trailer (in combination with the front wheel systems 142 moving in a reverse direction).

Figure 16A:
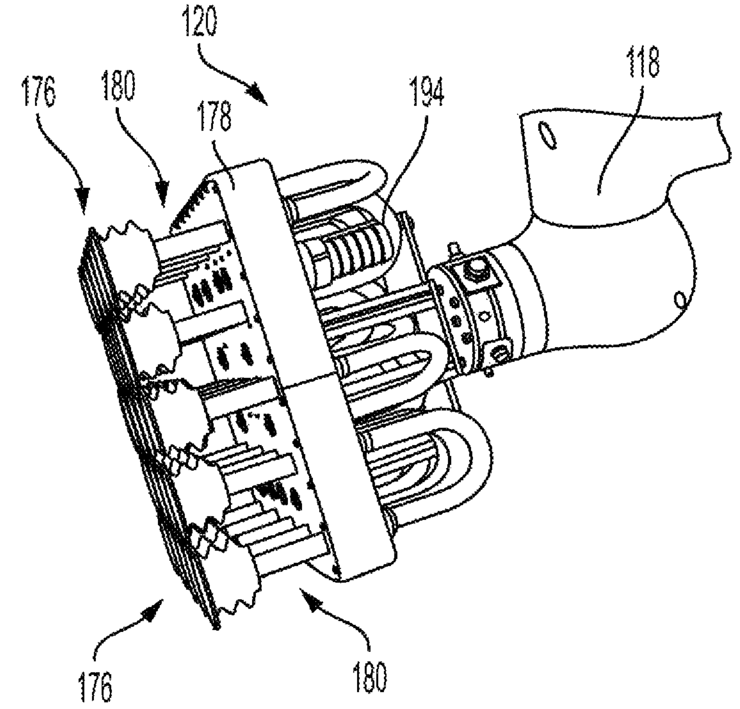
FIGS. 16A and 16B show illustrative diagrammatic views of an end-effector system of the object processing system of FIG. 3 showing an array of vacuum cups (FIG. 16A) and showing an enlarged view of a portion of the array of vacuum cups with some vacuum conduits removed to show vacuum valves (FIG. 16B)
Figure 16B:
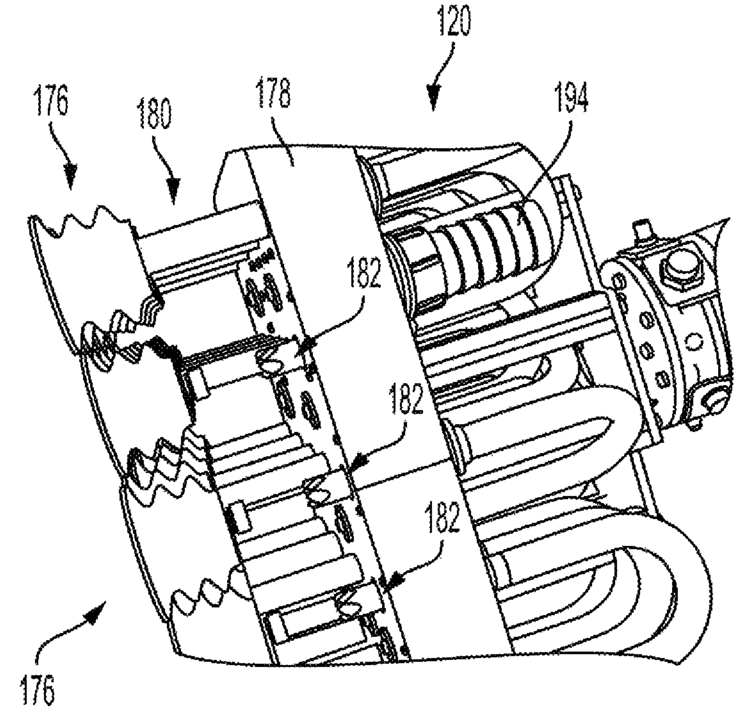
Figure 17A:
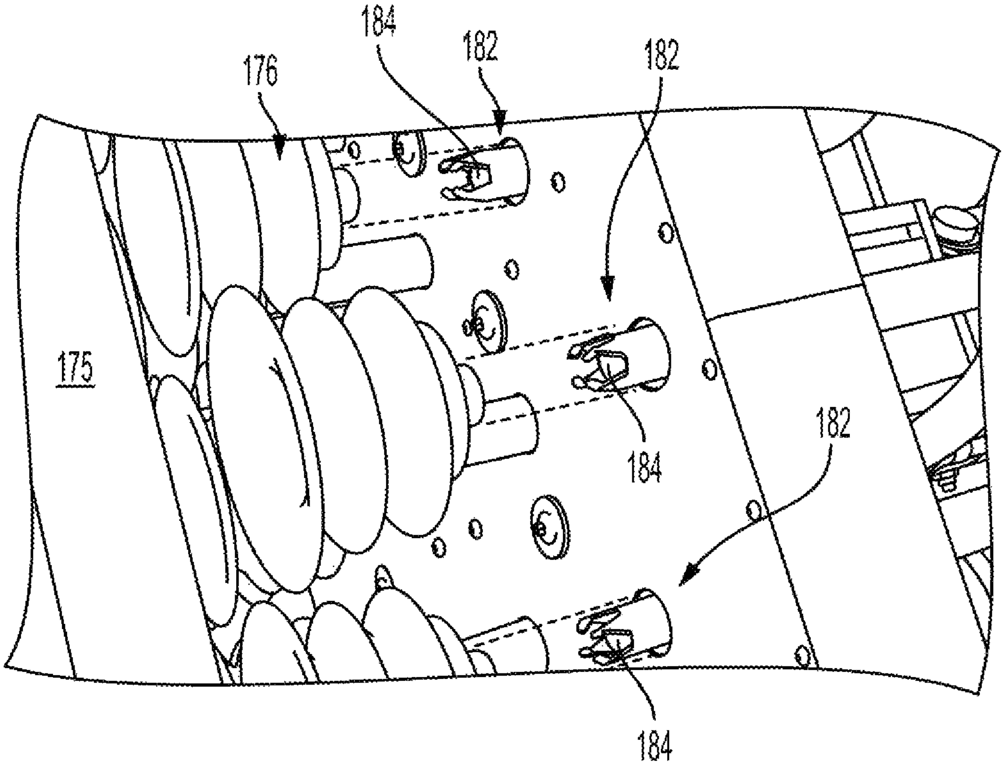
FIGS. 17A and 17B show illustrative diagrammatic enlarged views of vacuum valves of the system of FIG. 16B showing three valves in a closed position (FIG. 17A) and showing the three valves in an open position (FIG. 17B)
Figure 17B:
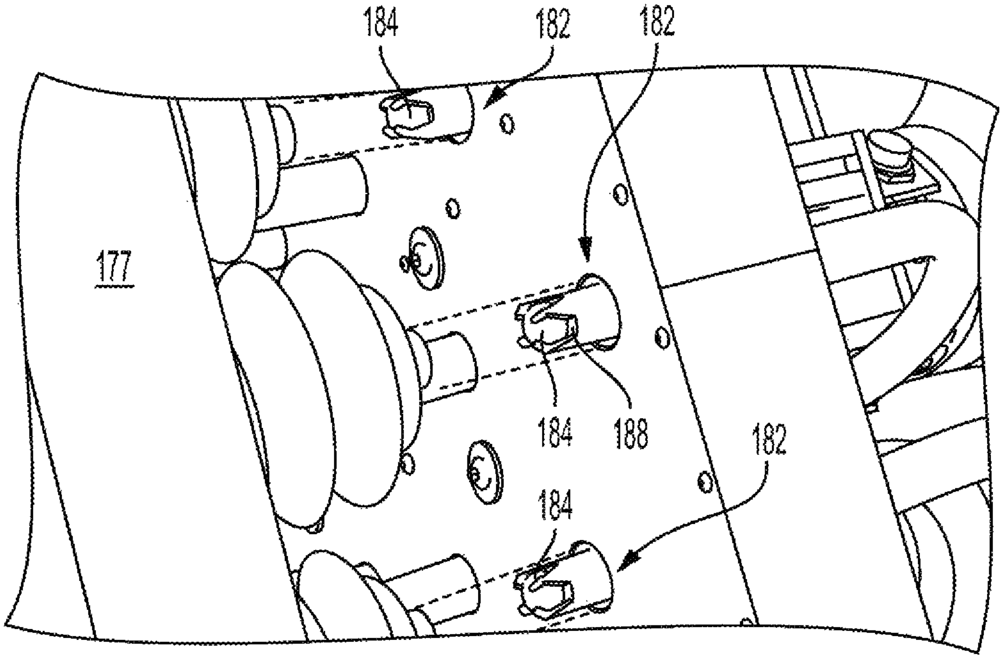

FIG. 16A shows an enlarged view of the end-effector 120 showing an array of vacuum cups 176 that are mounted to manifold 178 via conduits 180. With further reference to FIG. 16B, each conduit includes a check valve assembly 182 (three of which are shown by omitting each respective conduit). Each check valve assembly 182 within each conduit 180 is normally open to provide vacuum pressure (through the corresponding vacuum cup) when the vacuum cup is sufficiently engaged with an object but, in certain situations, closes off vacuum when an object is not engaged. For example, each check valve assembly 182 includes a movable valve ball 184 that is shown in FIG. 17A in a position to close off each respective vacuum line. When the vacuum cups 176 engage an object 177 as shown in FIG. 17B, each movable valve ball 184 associated with each applied vacuum cup moves outward with respect to the manifold 178 to permit the vacuum to flow through the respective vacuum cups 176.

Figure 18:
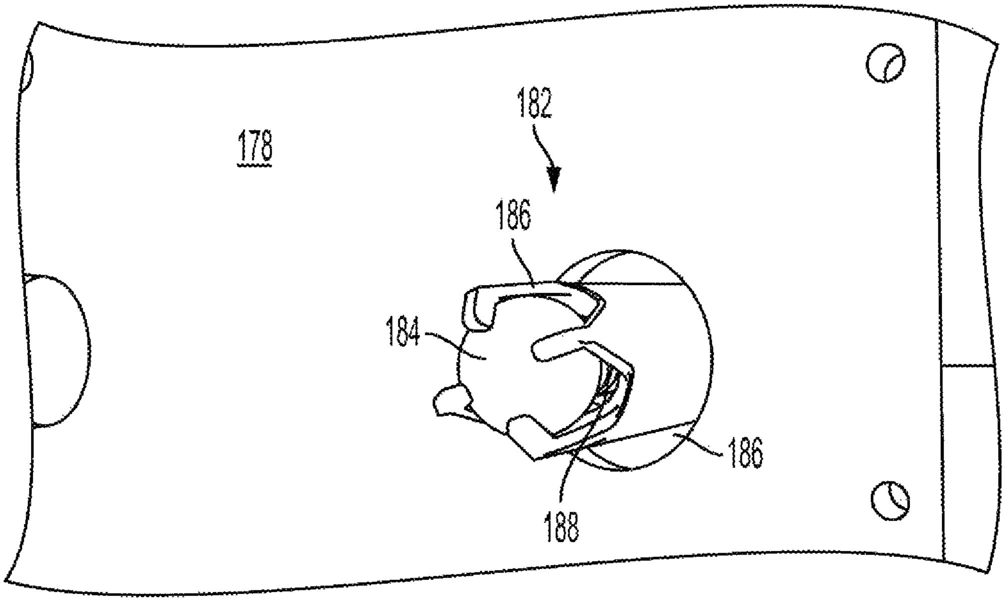
FIG. 18 shows an illustrative diagrammatic view of portions of the vacuum end-effector system of FIG. 16A and FIG. 16B showing an enlarged view of a vacuum valve assembly.

FIG. 18 shows an enlarged view of a check valve assembly 182, showing the movable valve ball 184 within a retention cage 186. Each check valve assembly 182 may also include a biasing spring 188 to bias the valve ball 184 in an outward position permitting vacuum flow. This permits the vacuum to flow even if the seal of the vacuum cup with an object (e.g., 177) does not produce a tight seal. For example, a high flow vacuum source (such as a blower) may be used that provides at each vacuum cup of, a vacuum with an airflow of at least about 100 cubic feet per minute, and a vacuum pressure at each vacuum cup of no more than about 65,000 Pascals below atmospheric (e.g., about 50,000 Pascals below atmospheric or 7.25 psi). The use of the check valves with the array of vacuum cups permits the vacuum to be applied only through the vacuum cups that are making sufficient contact with an object to be unloaded with the trailer.

Additionally, the array of vacuum cups 176 may be connected to the vacuum source (or plural vacuum sources) through independently controllable zones. FIG. 19 shows a central zone 190 as well as a more peripheral zone 192 (the vacuum cups outside the central zone 190). Each zone may be separately coupled to one of plural vacuum sources via connectors 194, 196 shown in FIG. 24A and may therefore provide different levels of vacuum and/or flow. The spring contact of each valve spring 188 may be chosen to provide vacuum at each vacuum cup when a drop in the pressure due to engagement or contact or proximity to an object is sufficient for moving objects. A high vacuum flow may be suitable for moving objects that cannot provide a tight seal with any vacuum cups while quickly establishing a stable grip of the object despite an imperfect seal.

Figure 20A:
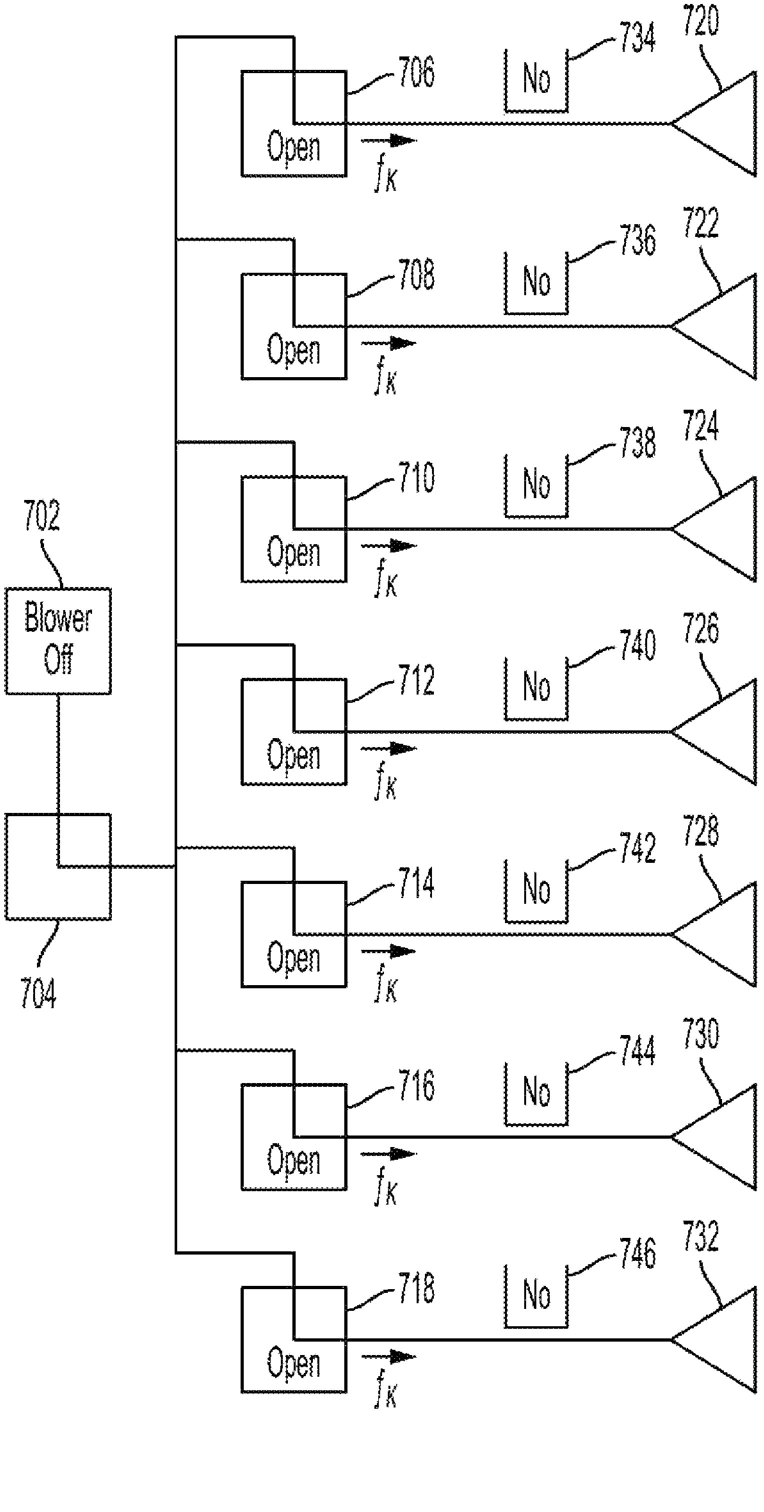
FIGS. 20A-20F show illustrative diagrammatic functional views of the vacuum valves in a zone with the vacuum off (FIG. 20A), the vacuum on with no objects grasped (FIG. 20B), the vacuum on with one object attached to all vacuum cups of the zone (FIG. 20C), the vacuum on with one object only attached to some but not all of the vacuum cups of the zone (FIG. 20D, the vacuum on with two objects attached to some but not all of the vacuum cups of the zone (FIG. 20E), and the system discharging objects from the vacuum cup array (FIG. 20F)
Figure 20B:
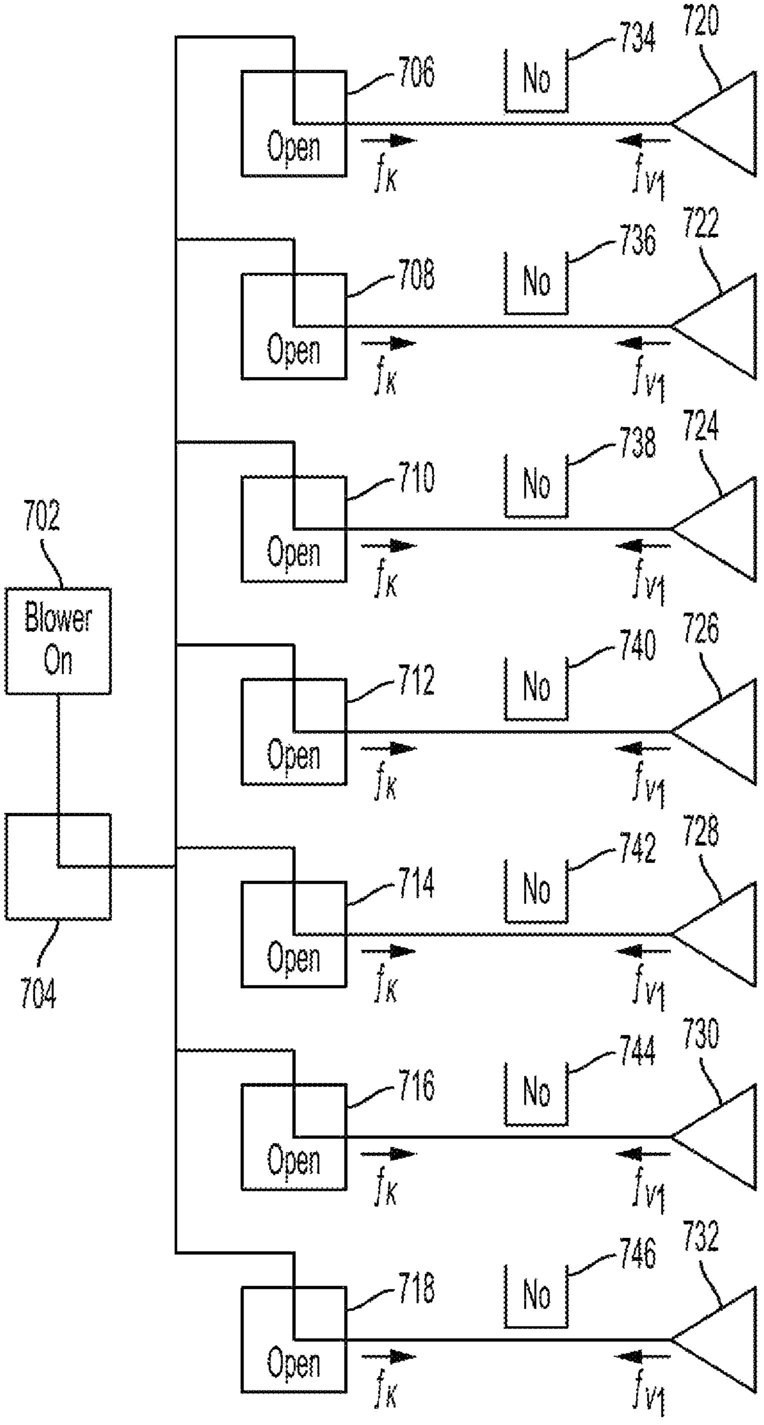

The high flow vacuum is provided to be on as the vacuum cups approach an object to be grasped. If some vacuum cups engage an object but others in a zone do not, the other vacuum cups will have their valves close off, providing further vacuum force to the engaged cups. This done automatically though the selection of the valve spring, the valve spring constant and any preloading as discussed herein. In particular, FIG. 20A shows a functional diagram of the zone 190 (shown in FIG. 19) that includes seven valve assemblies. When the blower 702 is off, each valve (706-718) is open because the force of the spring (188 in FIG. 18) is pushing the ball 184 to the open position. No vacuum is provided at the vacuum cups 720-732 because the blower 702 is off. The object detection sensors 734-746 register that no object is attached to any vacuum cup. With reference to FIG. 20B, when the blower 702 is turned on, vacuum flows from the blower valve 704 and in turn through each of the valves 706-718 from the vacuum cups 720-732. The valves 706-718 are each held open because the force of the spring ($f_k$) is greater than the opposing force ($f_{v1}$) generated by the flow of air due to the vacuum flowing through all seven vacuum cups 720-732. The spring 188 is selected and employed to provide that the valves will stay open under the force ($f_{v1}$) of the vacuum flowing through all cups. Again, the sensors 734-746 register that no object is attached to any vacuum cup.

Figure 20C:
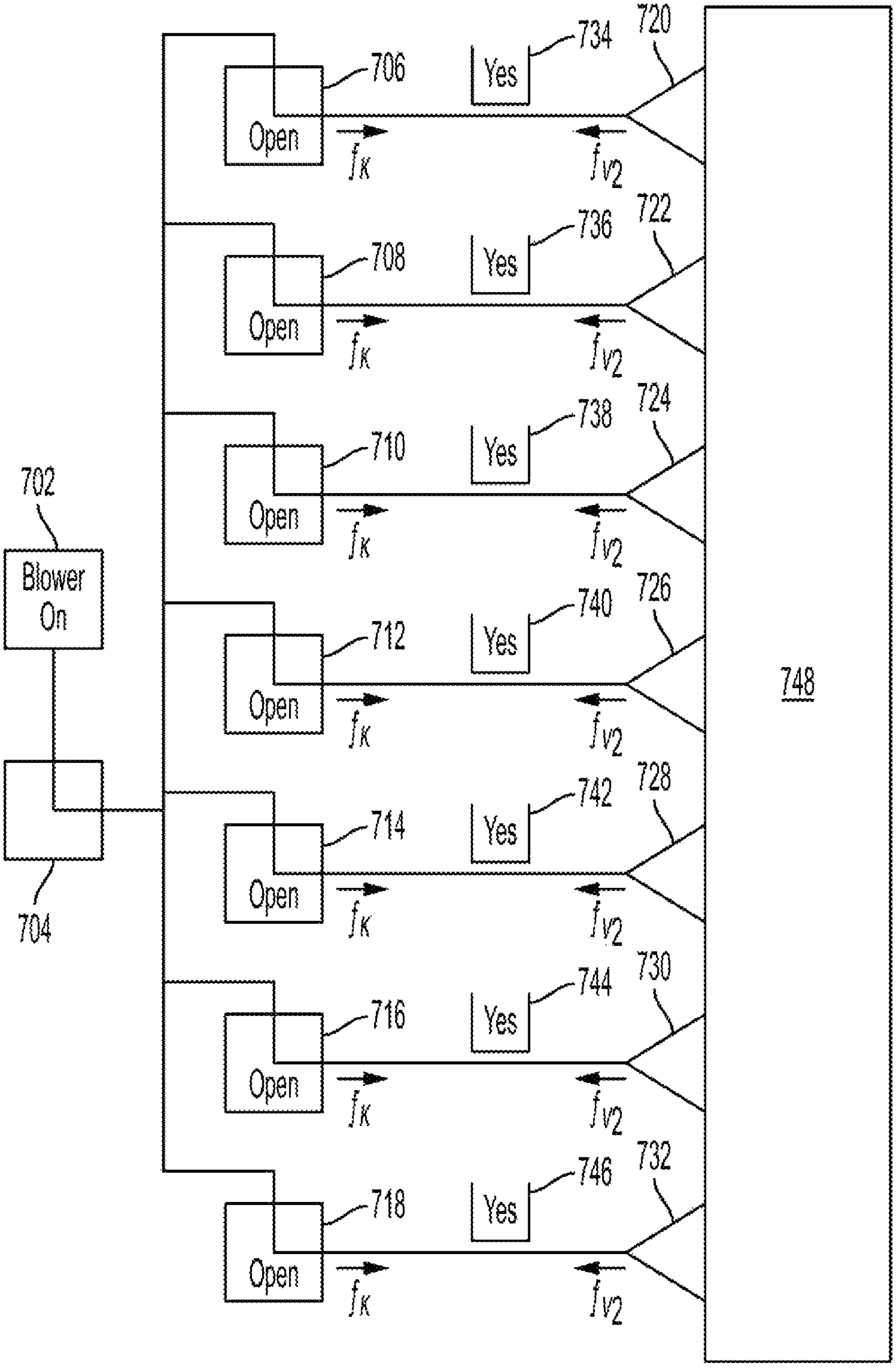

With reference to FIG. 20C, when all vacuum cups 720-732 engage an object 748 the flow of air due to the vacuum through the vacuum cups 720-732 is greatly reduced, causing the valves 706-718 to remain open. The sensors 734-746 will register that an object is engaged by their associated vacuum cups because the pressure in each respective vacuum conduit will be within a designed vacuum window (between full vacuum and atmosphere). The object 748 is discharged by actuation of the blower valve 704 as discussed below with reference to FIG. 20F.

Figure 20D:
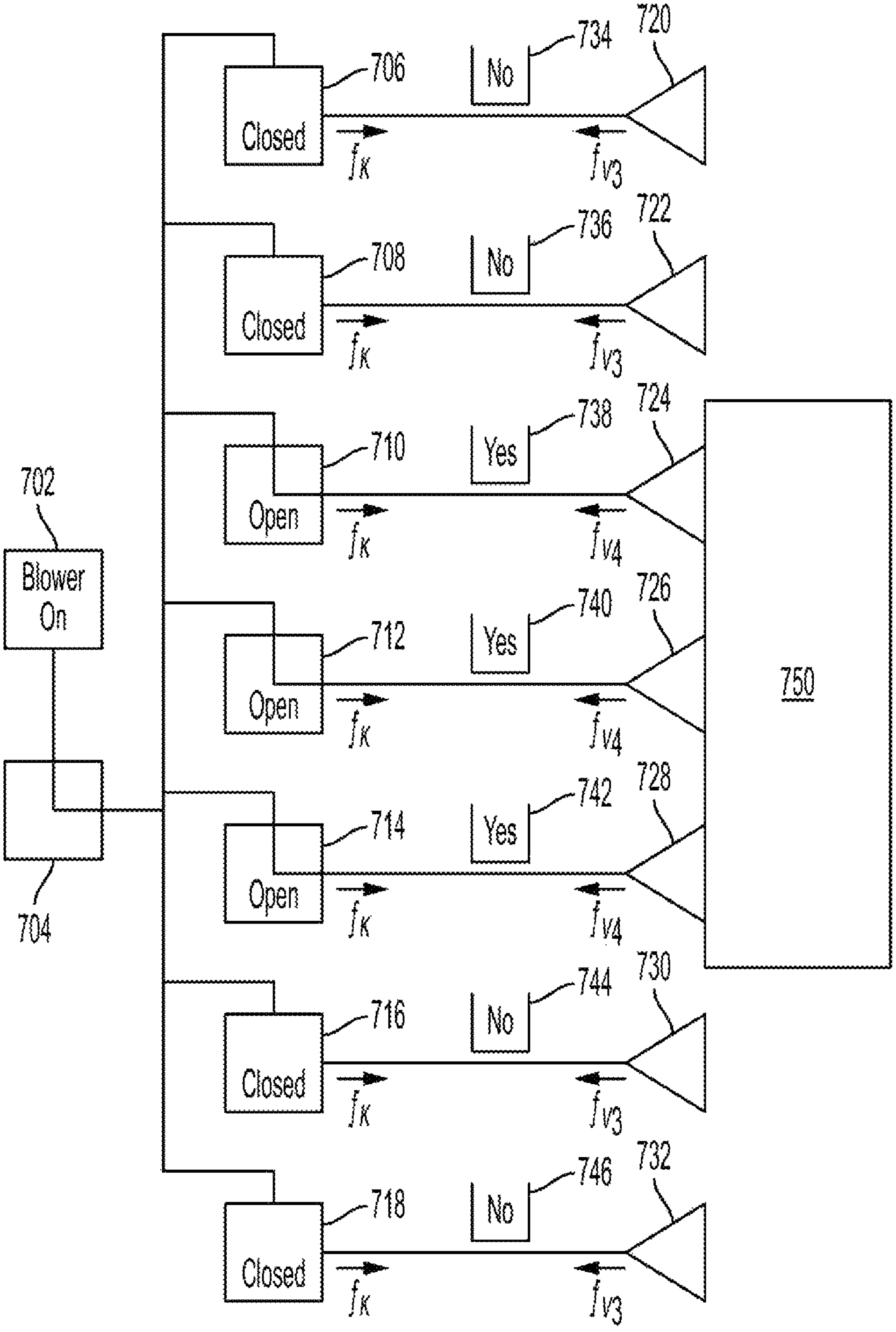

When some but not all vacuum cups of a zone (e.g., 190) engage an object such as object 750 in FIG. 20D, then the force ($f_{v4}$) of the flow of air due to the vacuum at the engaged vacuum cups 724, 726, 728 is greatly reduced as discussed above. In this case however, the force ($f_{v3}$) due to the vacuum flow through the cups 720, 722, 730, 732 is increased because three of the cups are nearly blocked (cups 724, 726, 738). The force $f_{v3}$ is greater than the force $f_{v1}$ and significantly is greater than the force of the spring constant $f_k$. This causes the valves 706, 708, 716, 718 to close, which increases the vacuum force applied to the object 750 by the engaged cups 724, 726, 728 so that $f_{v4}>f_{v2}$. The sensors 738, 740, 742 will register that an object is engaged by their associated vacuum cups because the pressure in each respective vacuum conduit will be within a designed vacuum window (between full vacuum and atmosphere). Conversely, sensors 734, 736, 744, and 746 will register that an object is not engaged since the pressure in each respective vacuum conduit will be approximately at atmospheric pressure. Note that in FIG. 17A, an object 175 is being held by the gripper but the vacuum cups associated with the valves shown do not engage the object 175, whereas in FIG. 17B, the vacuum cups associated with the valves shown do engage the object 177.

Figure 20E:
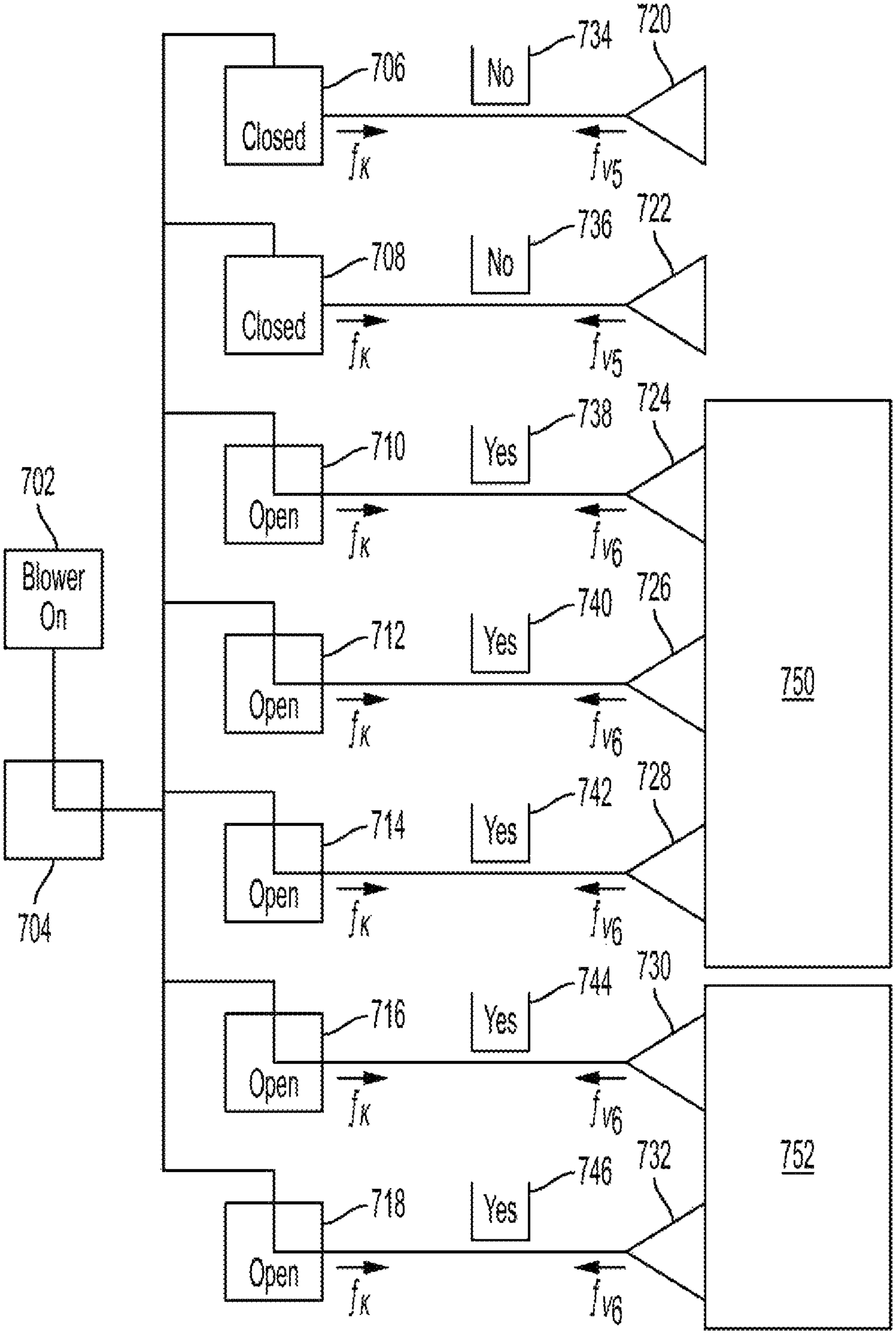
Figure 20F:
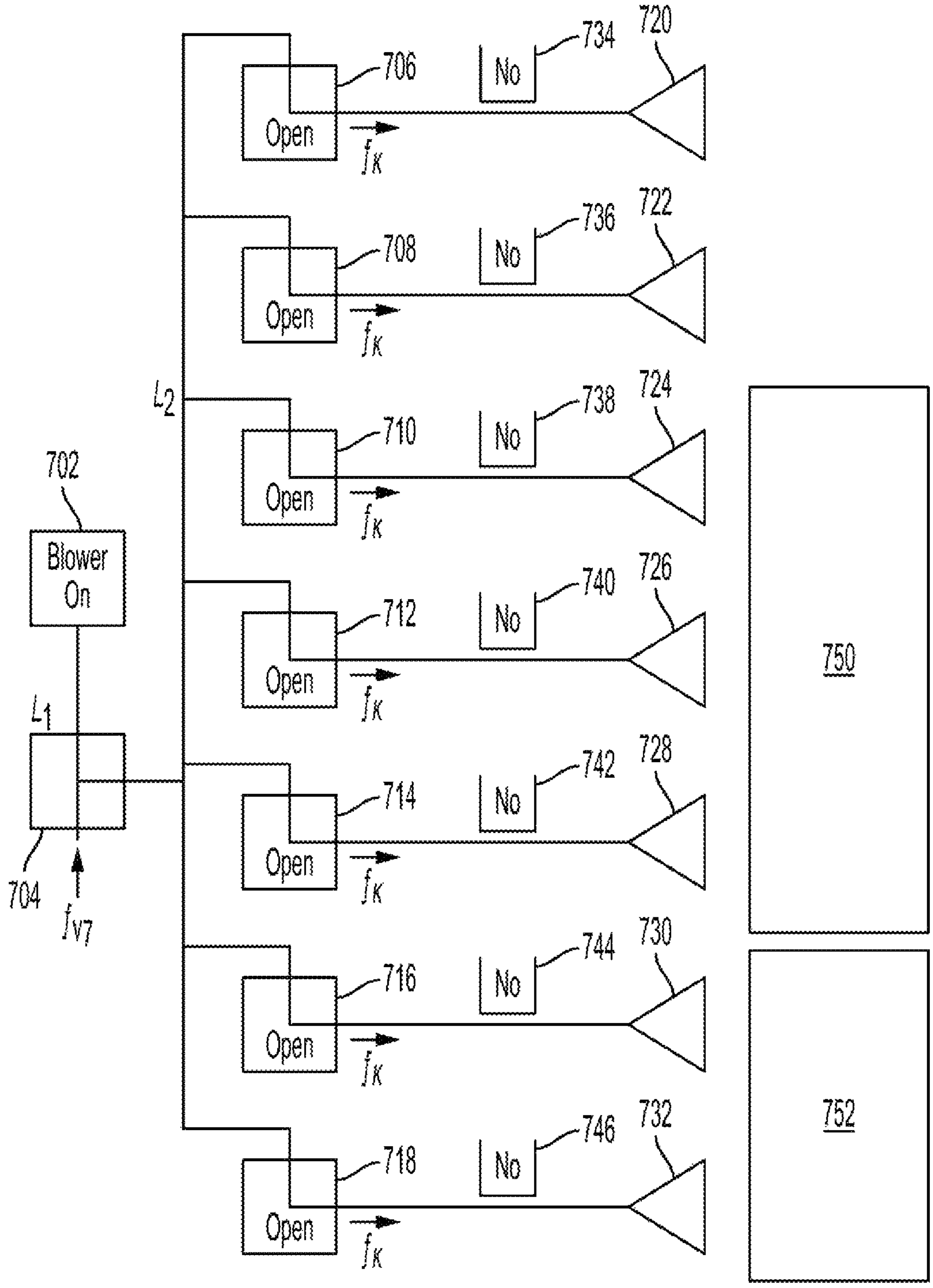

If a further object 752 is similarly engaged by vacuum cups 730, 732 along with object 750 by vacuum cups 724, 726 and 728 as shown in FIG. 20E, then valves 710, 712, 714, 716, and 718 will remain open because the force of the vacuum flow $f_{v6}$ at the vacuum cups 730, 732 will be reduced and fall below the force of the spring ($f_k$). The forces at the vacuum cups 724, 726, 728 will also be reduced from $f_{v1}$ to $f_{v6}$ but will still be much lower than the force of the spring ($f_k$). The force ($f_{v3}$) due to the vacuum flow through the cups 720 and 722 is increased because all of the cups are nearly blocked (cups 724, 726, 728, 730, and 732). The force $fv_5$ is greater the force of the spring constant $f_k$. This causes the valves 706 and 708 to close, which increases the vacuum force applied to the objects 750 and 752 by the engaged cups 724, 726, 728, 730, and 732. The sensors 738-746 will register that an object is (or one or more objects are) engaged by their associated vacuum cups because the pressure each the respective vacuum conduit will be within a designed vacuum window (between full vacuum and atmosphere).

Any object or objects engaged by one or more vacuum cups may be discharged through actuation of the blower valve 704. In particular, the valve 704 may open both the blower and the line to the valves 706 to atmosphere. Because the distance from the blower 702 to atmosphere (shown diagrammatically as $L_1$) is much shorter than an average distance through the valves 706-718 to the cups 720-732 (shown diagrammatically as $L_2$), the blower vacuum is maintained by drawing through the valve 704. The design of the system takes advantage of positioning the blower valve 704 very close to the blower 702.

Figure 21A:
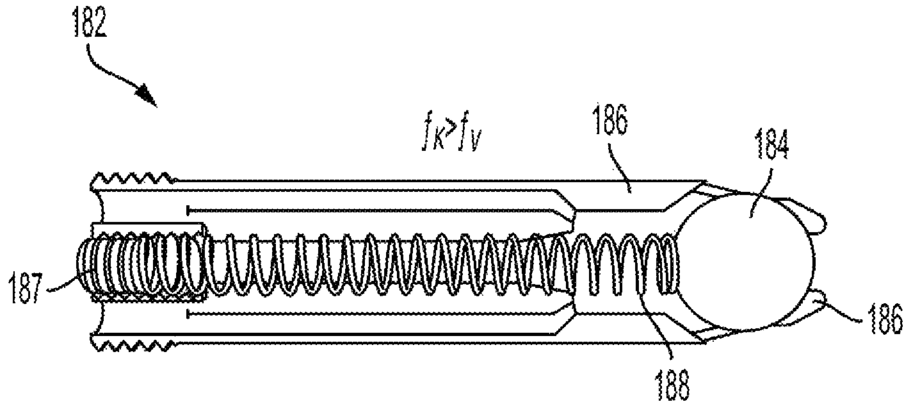
FIGS. 21A-21C show illustrative diagrammatic partially cut-away views of the vacuum valve of FIG. 18 showing the valve open (FIG. 21A), showing the valve initially closed (FIG. 21B), and showing the valve held closed (FIG. 21C)
Figure 21B:
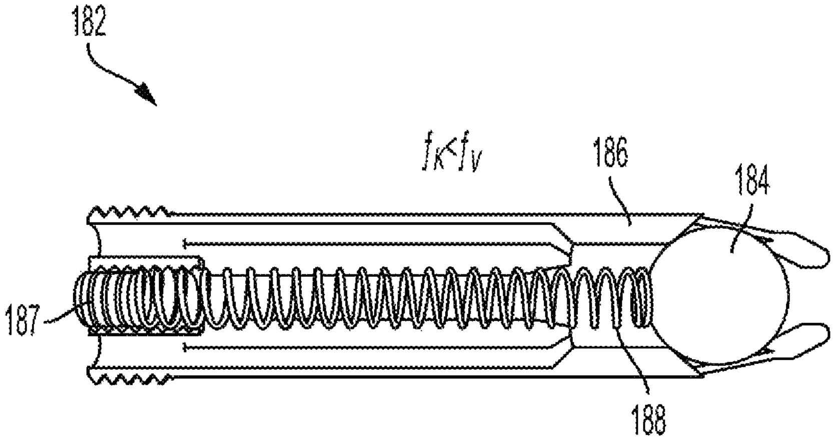
Figure 21C:
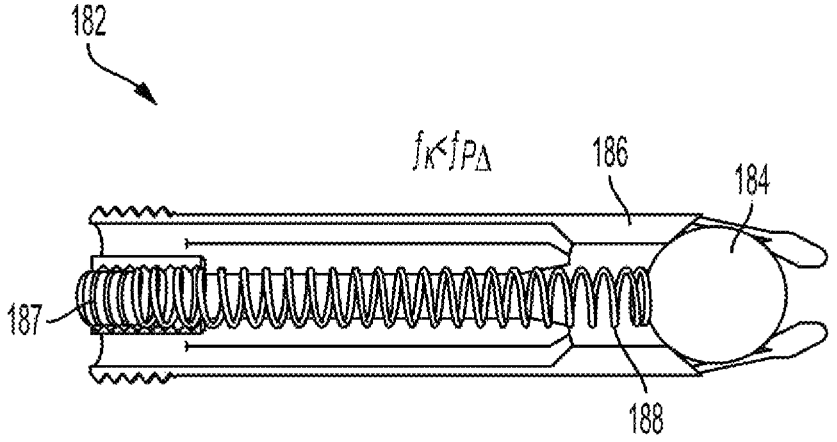

FIGS. 21A-21C show states of each valve assembly during use. FIG. 21A shows the valve assembly in the open position with the spring 188 pushing the ball 184 full against the outer claws of the retention cage 186. In this situation the force $f_k$ is greater than any opposing force ($f_v$) applied to the ball through associated vacuum cup ($f_k>f_v$). With reference to FIG. 21B, if the force $f_v$ proportional to the resistance of the air flow passing over the ball 184 becomes greater than the force $f_k$, (e.g., if some other vacuum cups are engaged but not the one associated with this valve which results in significantly more airflow through vacuum cups that are not engaged with an object), then the valve closes. Once closed, the airflow effectively stops but pressure in the valve conduit (and all vacuum cups engaged to an object) will become very reduced due to the vacuum, and the pressure differential ($f_{P\Delta}$) between the pressure within the valve conduit and atmosphere (on the other side of the ball) will keep the valve closed as shown in FIG. 21C.

The system may be designed to require a minimum number of vacuum cups to engage an object by selection and design of the spring knowing the operational forces under different vacuums. This minimum number may be, for example, one, two, three or four cups, and the tuning of the relationship may be achieved by varying the spring constant (switching our different springs) or by varying the preload on the springs. For example, the preloading on the spring 188 in FIGS. 21A-21C may be adjusted by adjusting (turning) the preloading plug 187.

Figure 22:
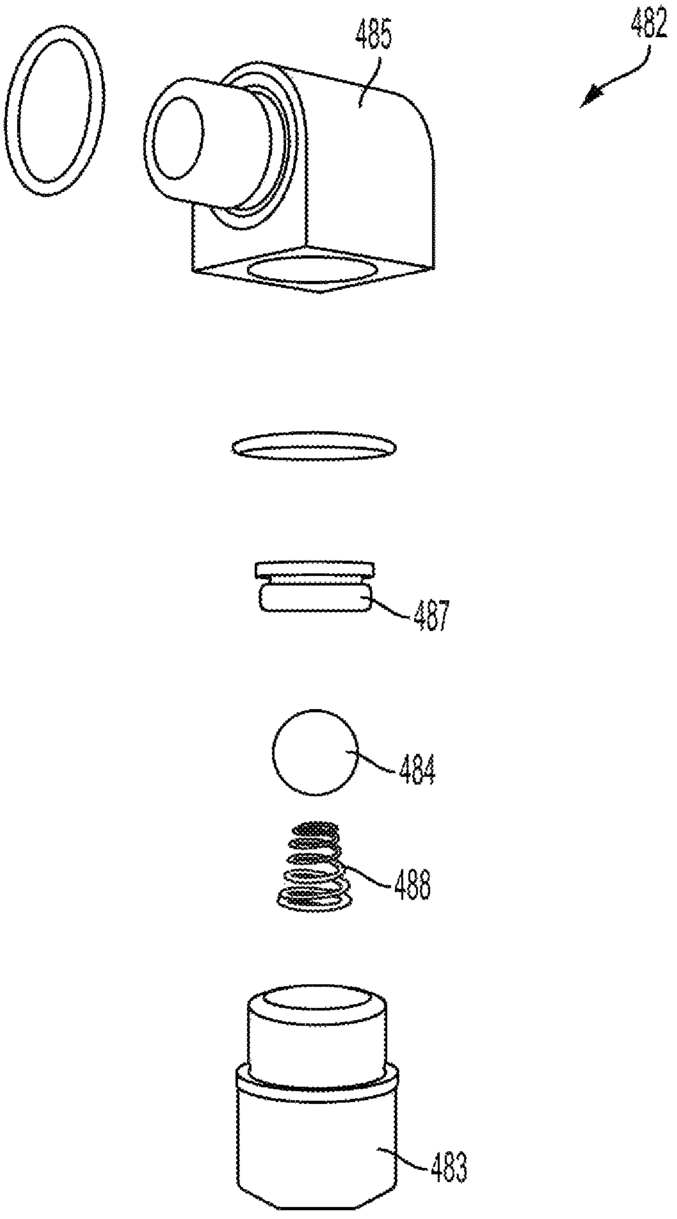
FIG. 22 shows an illustrative diagrammatic exploded view of a valve assembly for use in accordance with another aspect of the present invention.

FIG. 22 shows a valve assembly in accordance for use in a vacuum control system in accordance with a further aspect of the present invention that includes a base 483 that engages (e.g., threads into) a housing 485 capturing therebetween a spring 488, against a ball 484 that lodges against a pre-load stop 487. By changing the pre-load stop 487 for different thicknesses, the pre-loading of the valve assembly may be adjusted as discussed above.

Figure 23:
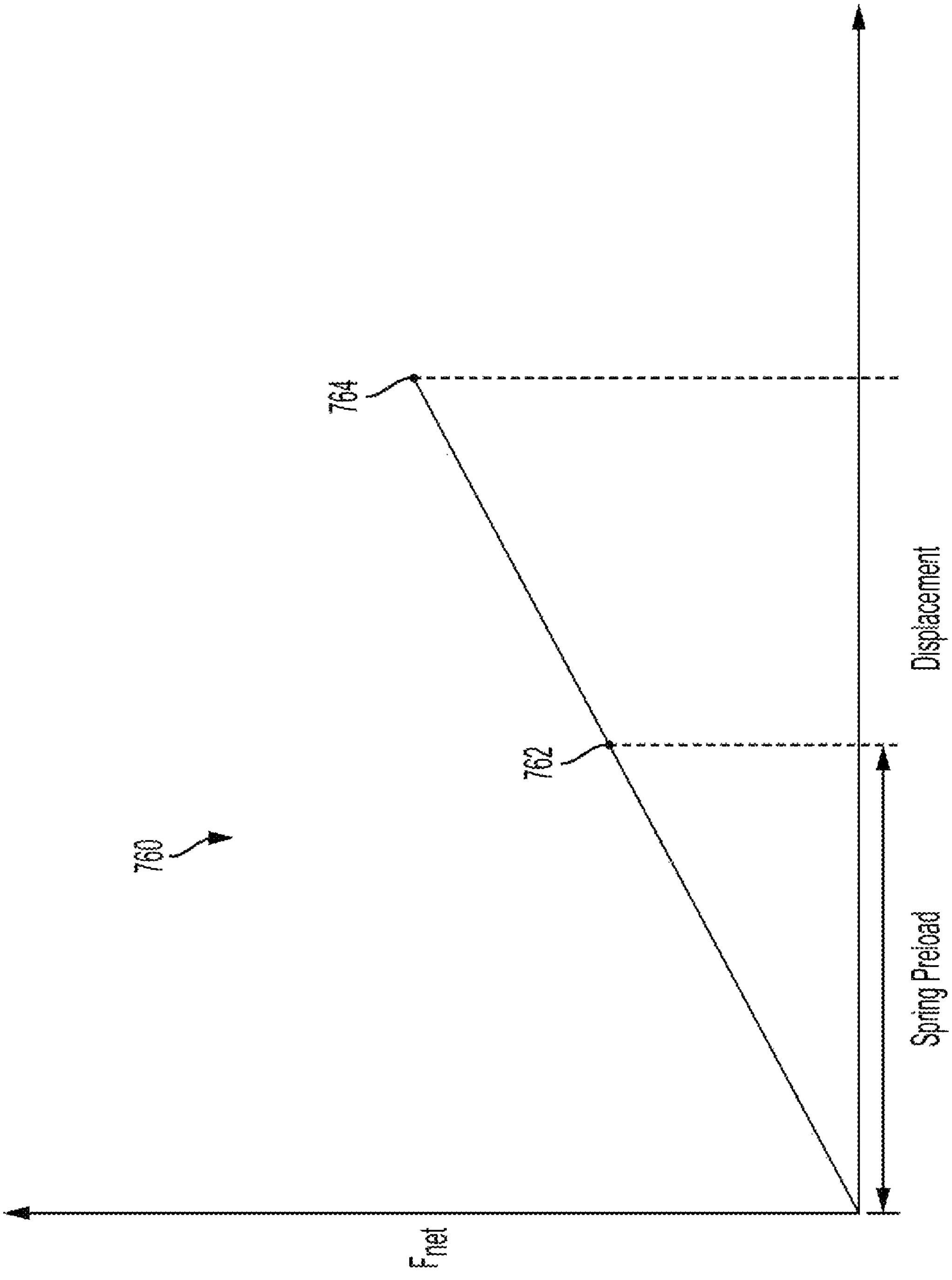
FIG. 23 shows an illustrative graphical representation of spring displacement in the vacuum valve of FIG. 18 versus the net force acting on the spring.

FIG. 23 shows at 760 these relationships, showing spring displacement verses the net force of the system in the direction of the spring force. The net force is $f_k-(f_v+f_{P\Delta})$. The graph shows the valve closed at 762 and shows the valve open at 764, and the system operates within this range providing that different vacuum forces are greater than the force of the spring while others are less than the force of the spring as discussed above. When the forces acting against the spring force $f_k$ are minimal, the valve is open as shown at 764. Adjusting the spring preload adjusts the force needed to close the valve.

Figure 24A:
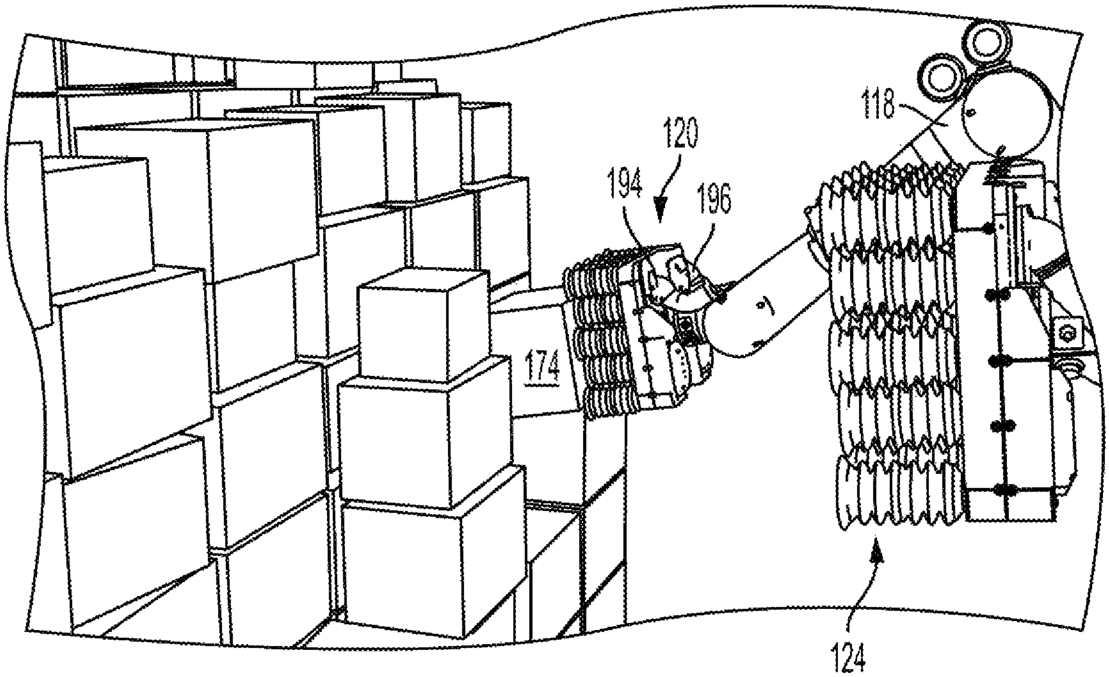
FIGS. 24A and 24B show illustrative diagrammatic views of the vacuum array end-effector system of FIG. 16A showing vacuum array end-effector grasping an object (FIG. 24A) and releasing an object onto a conveyance system (FIG. 24B) of the object processing system of FIG. 3.
Figure 24B:
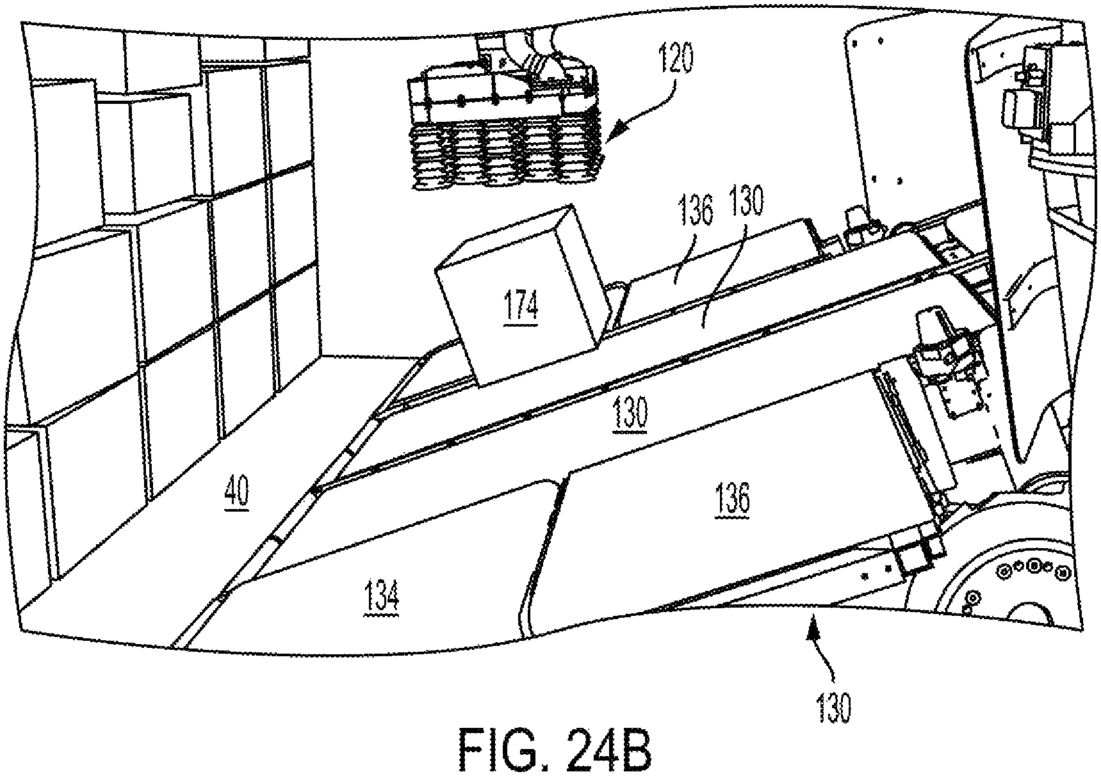

The end-effector 120 of the programmable motion device 118 therefore includes a plurality of vacuum cups 176 for engaging objects (e.g., object 174) as show in FIG. 24A, and for moving the objects to either the floor 40 of the trailer or to the loading portion 130 as shown in FIG. 24B. In accordance with various further aspects, system of the invention may employ two programmable motion devices with the same type of end-effector (e.g., both end-effector 120 or both end-effector 124).

The object processing system entered (under the control of the one or more computer processing systems) the trailer from the loading dock. An exceptions conveyor is provided to receive (e.g., via human personnel) articles and packages that may not be processible by the system, for example, due to being of a large size or heavy weight or oddly shaped (e.g., tires). The exceptions conveyor may be provided on one or both sides of the system. The exceptions conveyor(s) includes one or more exceptions perception systems to monitor the rate of flow of exceptions along the exceptions conveyor. Objects that are processed by the system will be provided to a fixed position facility intake conveyor, and the facility intake conveyor includes one or more intake perception systems to monitor the rate of intake of objects along the facility intake conveyor. A traveling conveyor is coupled to and moves with the system near the transition conveyor such that objects are readily moved from the transition conveyor to the traveling conveyor during object processing.

The traveling conveyor may be arranged under the facility intake conveyor but not be attached to the facility intake conveyor such that it may freely travel toward the trailer while still providing objects to the facility intake conveyor in accordance with an aspect. When the object processing system enters into the trailer, the transition conveyor that is coupled to the system enters the trailer with the system. As objects are unloaded (again as discussed above), objects are provided from the transition conveyor to the traveling conveyor, and then provided from the traveling conveyor to the facility intake conveyor.

Again, the rate of flow of objects along the facility intake conveyor is monitored (as are the rates of flow into the facility from additional trailers). By monitoring these rates of flow, the facility may identify potential backups within the facility in the event that objects are entering the facility at too high a rate. In this way, the (one or more) systems may adjust their rate of removal of objects from the trailer(s) to provide a timing buffer for the facility, ensuring that an efficient flow of objects is being provided within the facility. Similar buffering may be provided by the exceptions conveyor(s).

Figure 25A:
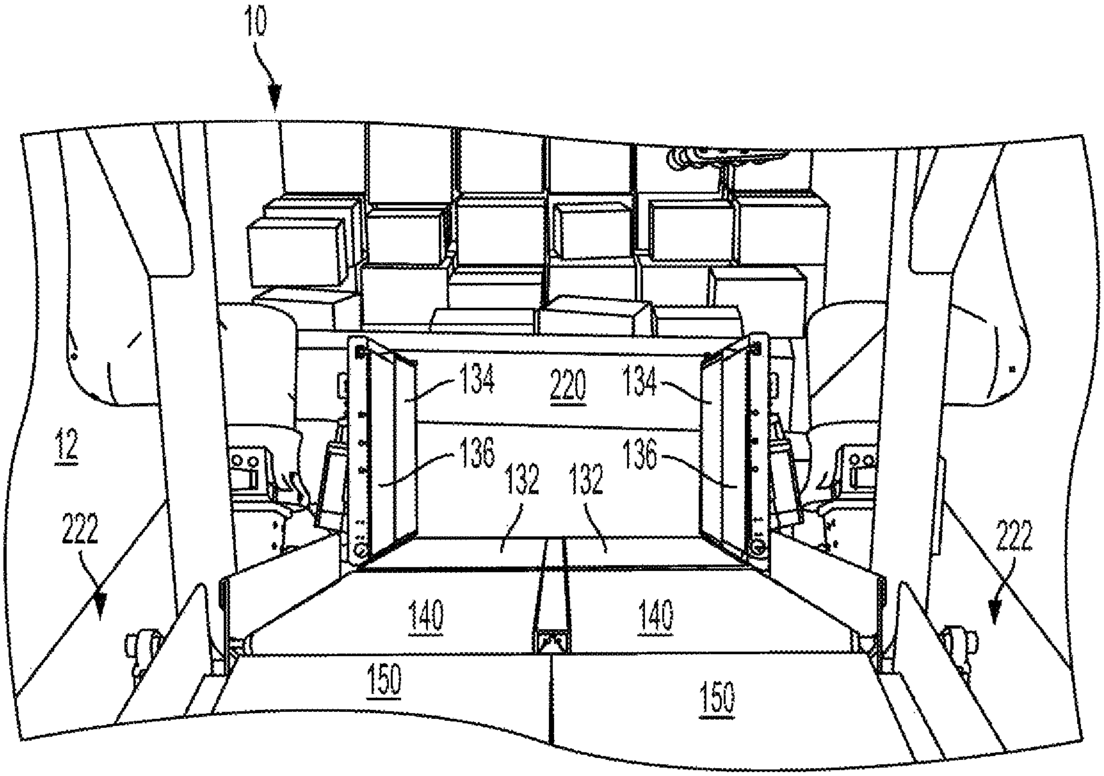
FIGS. 25A and 25B show illustrative diagrammatic views from the mobile system of the object processing system of FIG. 3, showing the presence of an exception object in the trailer (FIG. 25A) and showing the exception object having been placed on the conveyance system of the mobile system (FIG. 25B)

With reference again to FIG. 3, the system may include a plurality of perception systems that are directed toward the interior of the trailer 12 from the object processing system 10. The perception systems 152, together with the one or more computer processing systems, may be used to identify whether retention devices (such as straps, netting or braces) are present within the trailer, requiring the intervention of human personnel. In this case, the conveyor sections 134, 136 are raised as shown in FIG. 25A, permitting human personnel to enter the trailer and move past the system 10 to access (and remove) the detected retention device. In the systems discussed herein, one or more of the conveyor wings may open, permitting entry of human personnel.

Figure 25B:
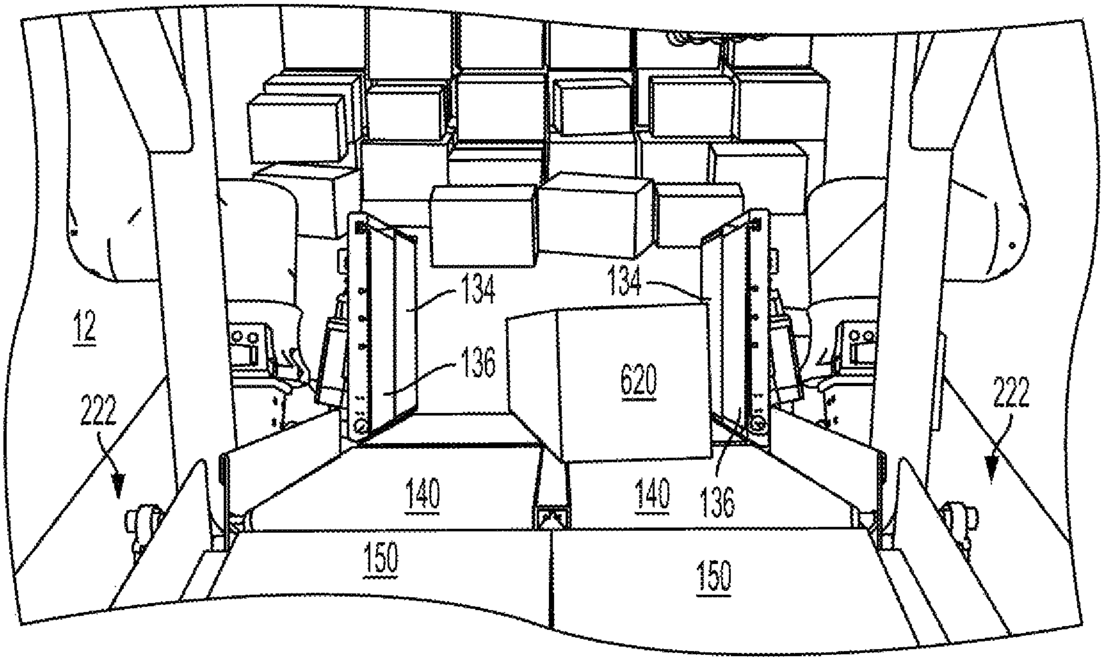

The perception systems 152 may also detect the presence of an exception (again an object that is too large, too heavy or formed of a shape that is difficult to process). This determination may also be made based on one or more failed attempts to process the object. When any of this occurs, the system may raise the conveyor sections 134, 136 as shown in FIG. 25A, permitting human personnel to enter the trailer and move past the system 10 to access the exception 220. The human personnel may carry the exception 620 out of the trailer to the exceptions conveyor(s) 204, or the human personnel may place the object onto the conveyor sections 132 as shown in FIG. 25B for processing by the system 10 if appropriate (e.g., it fits on the conveyor sections 132 and is not outside facility size or weight restrictions).

In accordance with further aspects, the object processing system may include conveyor sections as discussed above, but the conveyor sections may be replaced with static guide panels that include guides. The guides on the panels should facilitate movement of objects up the conveyor sections to be urged toward a central line of movement through the object processing system. The conveyor sections together with the guide panels are also rotatable to an upright position for the purposes discussed above, including entering the trailer and permitting human personnel to access the interior of the trailer once the object processing system has entered the trailer for any of removing a retention device or handling an exception. Additionally, when the conveyor sections 134, 136 are in the vertically raised position, the conveyors are still operable to facilitate moving objects along the conveyor sections 132. This may even facilitate clearing any jams on the conveyor sections 132 by using the raised conveyor sections 134, 136 to facilitate moving objects along the conveyor section 132 by contacting the vertical sides of the objects, and the conveyor sections 134, 136 further may be used to facilitate clearing any jams when rotated past vertical by possibly contacting top surfaces of objects.

Figure 27A:
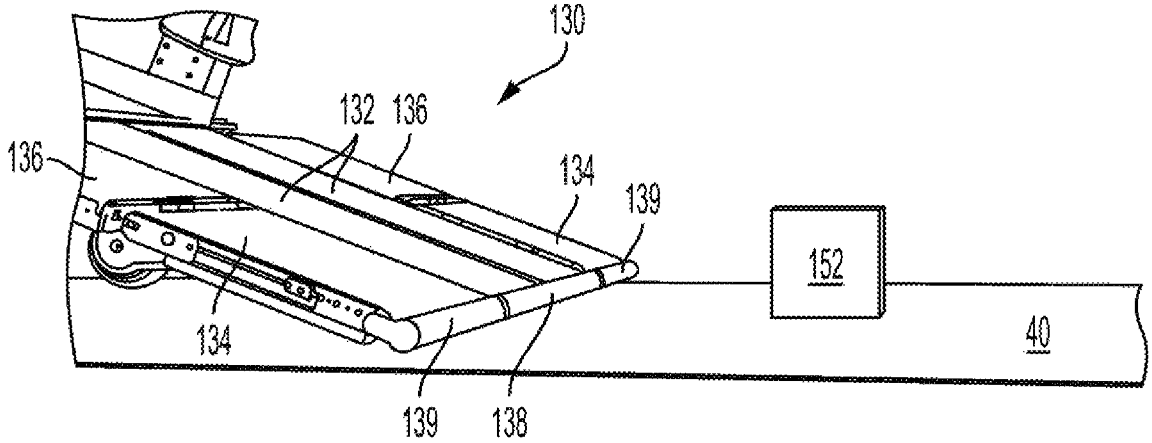
FIGS. 27A and 27B show illustrative diagrammatic views of a kicker roller in the object processing system of FIG. 3 showing the kicker rollers approaching an object (FIG. 27A) and engaging an object (FIG. 27B) to urge the object onto the mobile system.
Figure 27B:
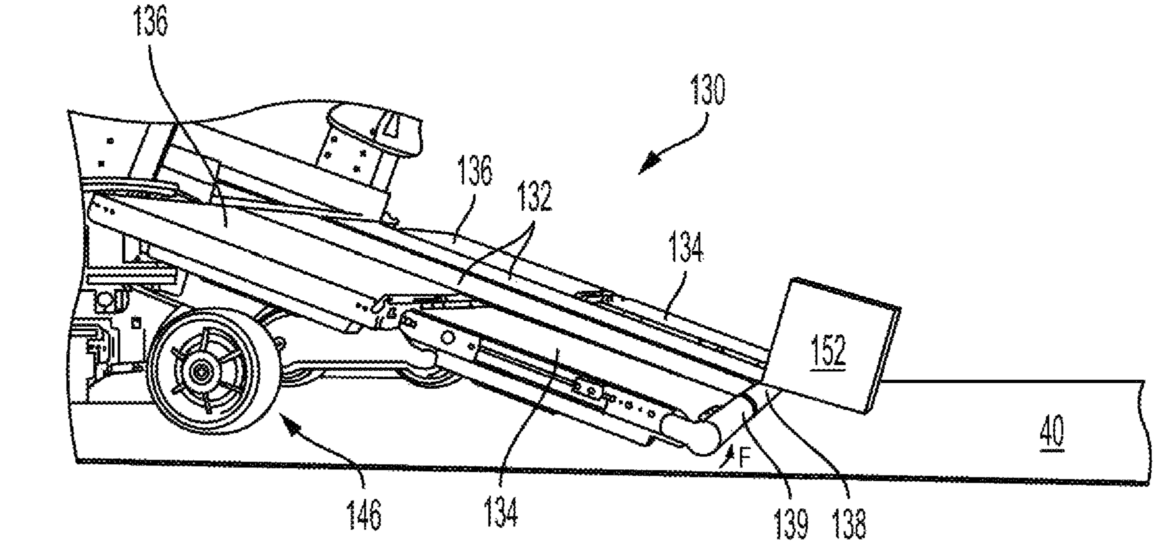

As discussed herein, objects may be deposited onto the loading portion 130 or may be deposited onto (or already be on) the trailer floor 40. With reference to FIGS. 27A and 27B, an object may be contacted by a kicker roller 138 and/or 139 and kicked up onto the loading portion 130. FIG. 27A shows an object 152 being approached by the loading portion 130, and FIG. 27B shows the object 152 being lifted and moved onto the loading portion 130 by the kicker roller 138.

Figure 26A:
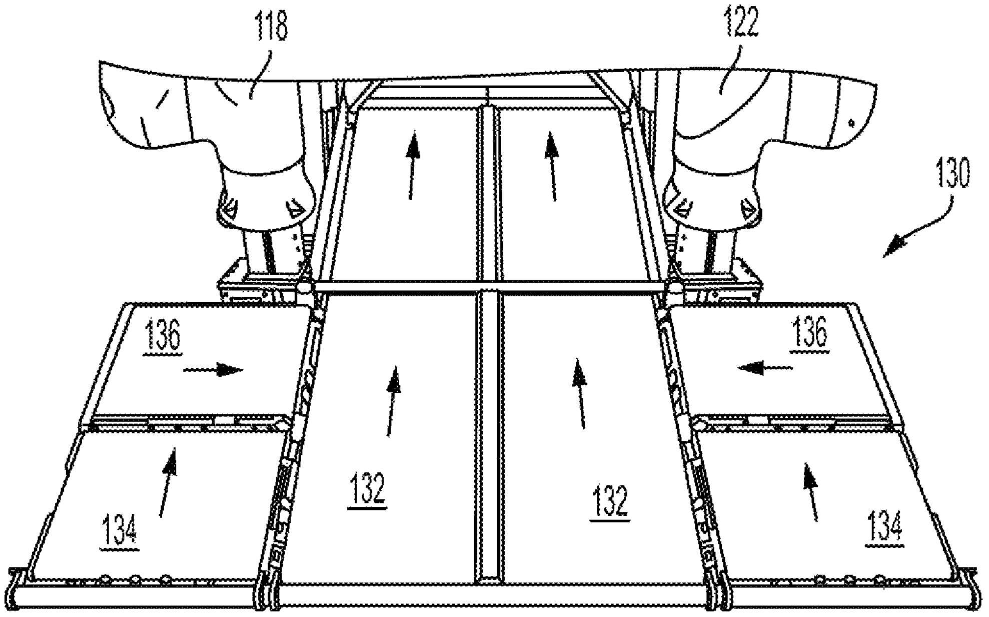
FIGS. 26A and 26B show illustrative diagrammatic views of a conveyance system of the object processing system of FIG. 3 showing a loading conveyor section at a first width (FIG. 26A) and at an expanded second width (FIG. 26B)
Figure 26B:
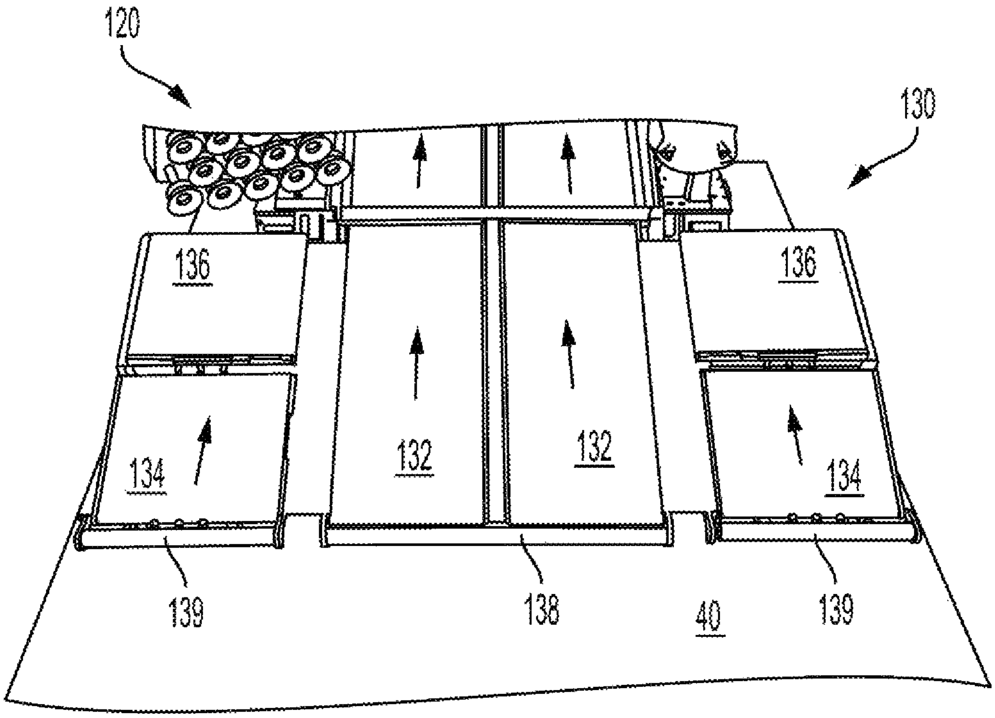

FIGS. 26A and 26B show the loading conveyor section 530 of FIGS. 27A and 27B including the kicker rollers 138, 139 and the conveyor sections 132, 134, 136 leading to the collection conveyor 140. FIG. 26A shows that the direction of movement of the conveyors of these sections provides that the conveyor sections 132, 134 move in the direction toward the collection conveyor 140, and the conveyor sections 136 move in a transverse direction toward each other from opposite sides of the loading portion 130. With further reference to FIG. 26B, the loading portion 130 may further include expansion mechanisms as shown in FIG. 26B for extending the conveyor sections 134, 136 away from the conveyor sections 132 so that the outer width of the loading portion 130 approximates the width of the floor 40 within the trailer. The expansion mechanism can be adjustable with a leadscrew linkage between conveyor sections 134 and 136 and the supporting frame of loading portion 130 and either manually operated or actuated with an electrical motor drive module. A flexible bellows can be provided to prevent small objects from falling between the conveyor sections 134 and 136 when expanded.

Figure 28:
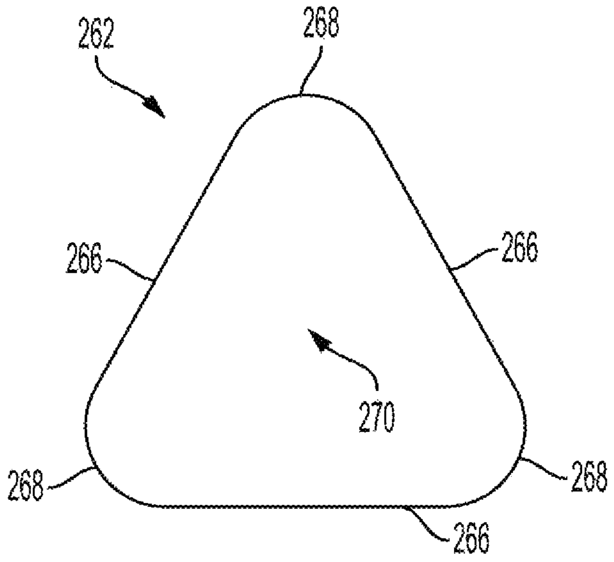
FIG. 28 shows an illustrative diagrammatic side sectional view of a shaped kicker roller for use in accordance with an aspect of the present invention.
Figure 29:
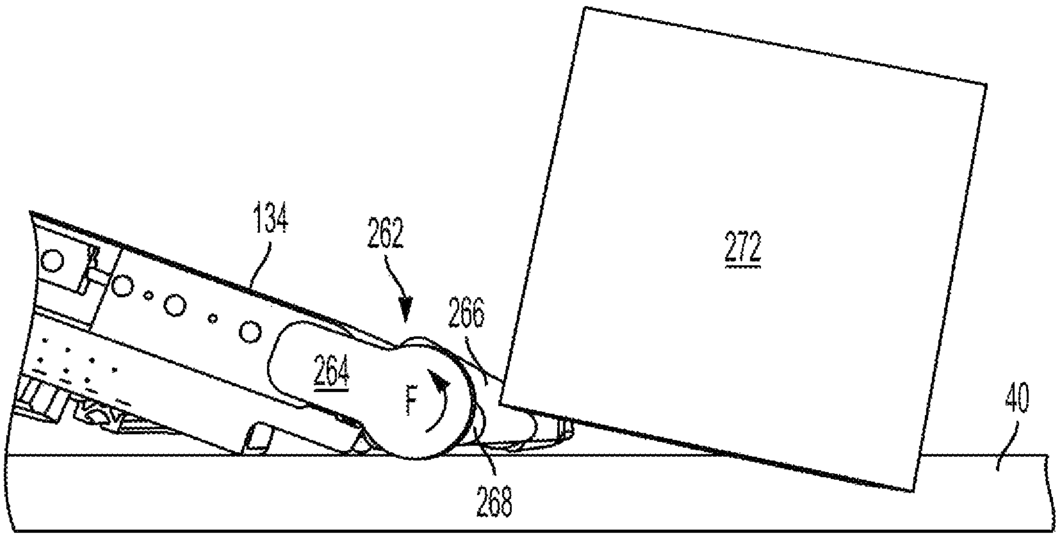
FIG. 29 shows an illustrative diagrammatic view of an object being engaged by the shaped kicker roller of FIG. 28.

The object processing system may include lead kicker rollers with features that facilitate engagement with objects within the trailer. FIGS. 27A and 27B, for example, show an object processing system that includes a loading portion 130 with conveyor sections 132, 134, 136 as discussed above as well as kicker rollers 138, 139 in place of the rollers that may be circular in cross-sectional shape or may be shaped to include engagement features. FIG. 28 shows an end view of a roller 262 showing three peaked regions 268 separated by three flat regions 266 forming a generally triangular cross-sectional shape as shown. When the rollers 262 are rotated about their respective centers 270 (shown in FIG. 28) in the direction shown at F in FIG. 29, the rollers 262 may engage an object 272 to be lifted by a peaked region 268 of one or more rollers as shown in FIG. 29. The peaked regions 268 of the rollers 262 may therefor facilitate engagement of the system 260 with objects on a floor 40 of a trailer. As discussed above each roller 262 may be differently or independently driven with respect to the conveyor sections 132, 134.

Figure 30:
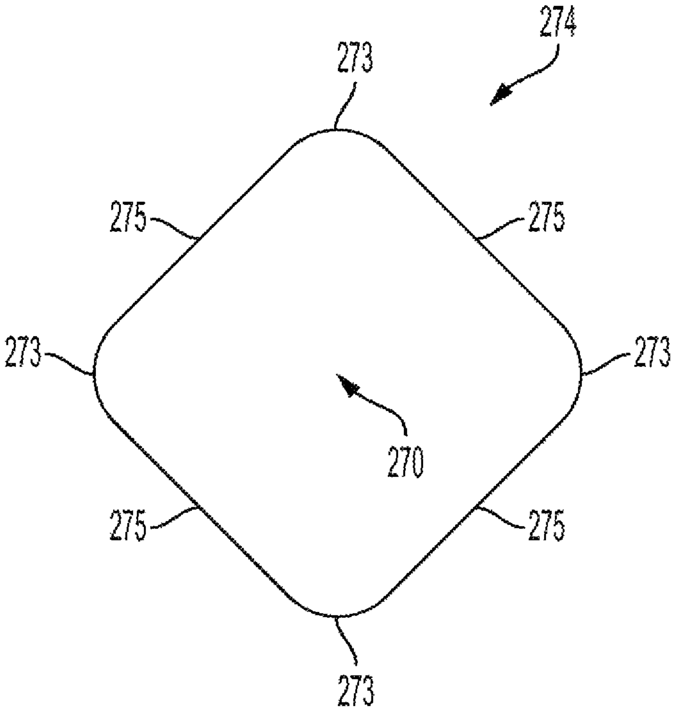
FIG. 30 shows an illustrative diagrammatic side section view of a shaped kicker roller for use in accordance with another aspect of the present invention.

In accordance with further aspects, the kicker rollers may be provided in a variety of shapes and functionalities. For example, FIG. 30 shows a kicker roller 274 that includes four peaked regions 273 separated by four flat regions 275 forming a generally square cross-sectional shape as shown. When the rollers 274 are rotated about their respective centers 270 in the direction shown at F in FIG. 29, the rollers 274 may engage an object to be lifted by a peaked region 273 of one or more rollers. The peaked regions 273 of the rollers 274 may therefor facilitate engagement of the system 260 with objects on a floor 40 of a trailer.

Figure 31:
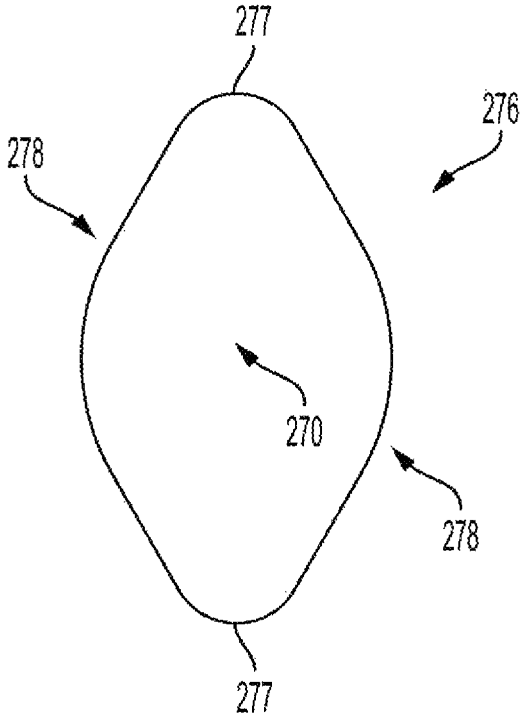
FIG. 31 shows an illustrative diagrammatic side section view of a shaped kicker roller for use in accordance with a further aspect of the present invention.

FIG. 31 shows a kicker roller 276 that includes two peaked regions 277 separated by two gently curved regions 278 forming a generally oval cross-sectional shape as shown. When the rollers 276 are rotated about their respective centers 270 in the direction shown at F in FIG. 29, the rollers 276 may engage an object to be lifted by a peaked region 277 of one or more rollers. The peaked regions 277 of the rollers 276 may therefor facilitate engagement of the system 260 with objects on a floor 40 of a trailer.

Figure 32:
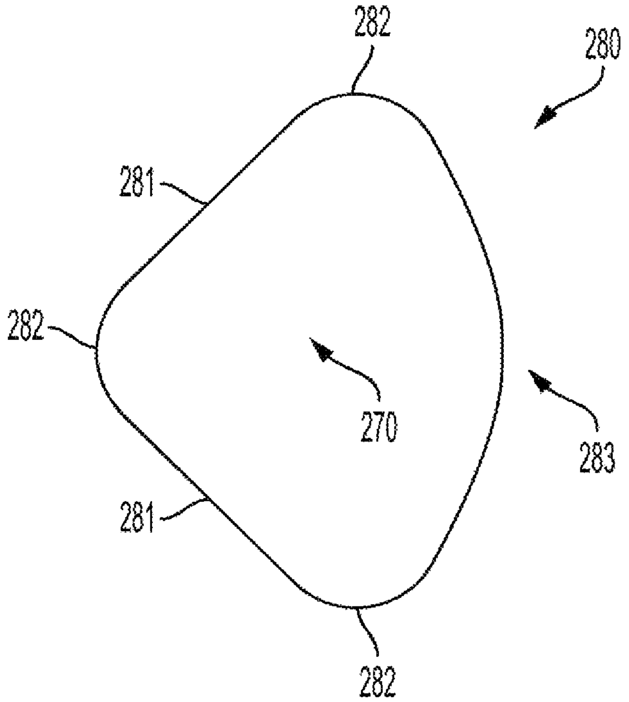
FIG. 32 shows an illustrative diagrammatic side section view of a shaped kicker roller for use in accordance with a further aspect of the present invention wherein the rotational symmetry is a-symmetric.

The kicker rollers also need not be symmetric in cross-sectional shape. FIG. 32 shows a kicker roller 280 that includes three peaked regions 282, one of which joins two straight regions 281; the other two peaked regions 282 are joined by a single gently curved region 283 forming an asymmetric outer surface as the roller rotates. When the rollers 284 are rotated about their respective centers 270 in the direction shown at F in FIG. 29, the rollers 284 may engage an object to be lifted by a peaked region 282 of one or more rollers. The peaked regions 282 of the rollers 284 may therefor facilitate engagement of the system 260 with objects on a floor 40 of a trailer.

In accordance with further aspects, the kicker rollers (e.g., any of rollers 138, 139, 262, 274, 276, 280) may be rotated about a point that is not the center of the roller causing the roller to rotate a cam fashion, which may engage an object to be lifted by an outer cam portion of one or more rollers to facilitate engagement of the system 260 with objects on a floor 40 of a trailer.

Figure 33:
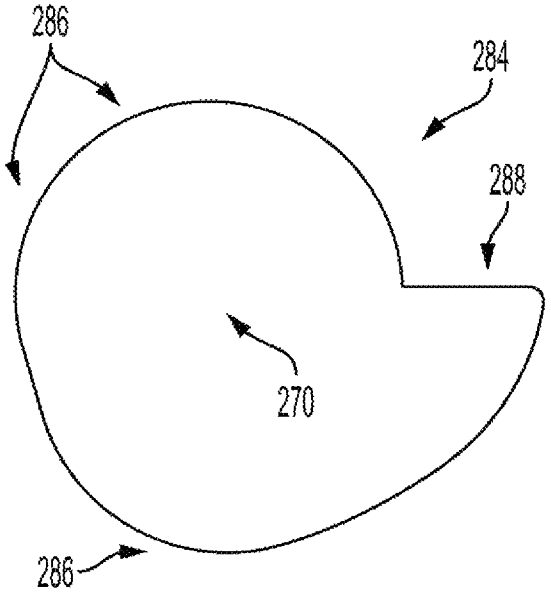
FIG. 33 shows an illustrative diagrammatic side section view of a shaped kicker roller for use in accordance with a further aspect of the present invention wherein the kicker roller is cam-shaped in cross-section.

FIG. 33 shows a kicker roller 284 that includes an elongated outer surface of a gradually increasing radius 286 and a peaked region 288 where the outer surface sharply reduces in radius forming a generally cam-shaped cross-sectional shape as shown. When the rollers 284 are rotated about their respective axis of rotation 270 in the direction shown at F in FIG. 29, the rollers 284 may engage an object to be lifted by the peaked region 288 of one or more rollers. The peaked regions 288 of the rollers 284 may therefor facilitate engagement of the system 260 with objects on a floor 40 of a trailer.

Figure 34:
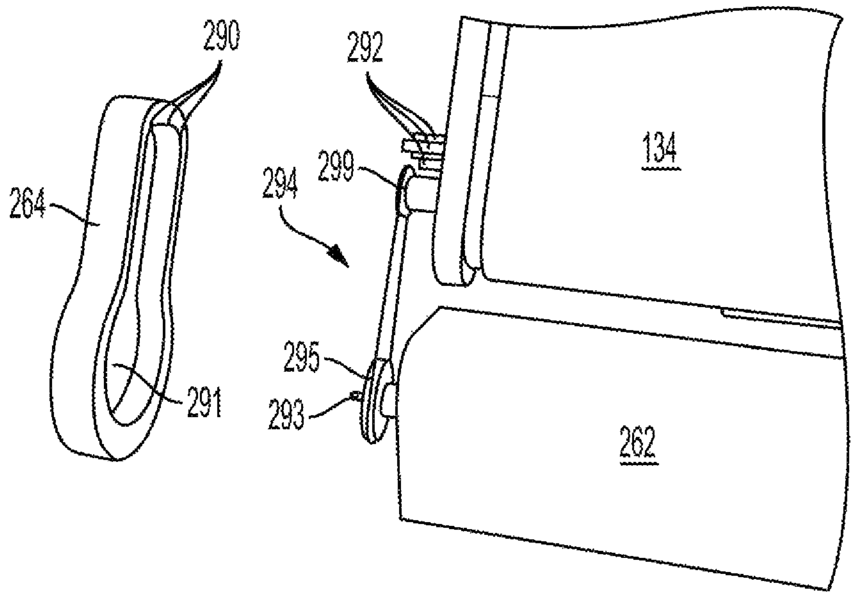
FIG. 34 show an illustrative diagrammatic view of a drive system for the kicker roller of the mobile system of FIG. 3 in which the drive system includes drive belts coupled to the loading conveyors.

As noted above, each of the rollers 138, 139, 262, 274, 276, 280, 284 may be differently or independently driven with respect to the conveyor sections 132, 134. For example, FIG. 34 shows that the cover 264 includes alignment holes 290 for receiving alignment pins 292 on the support structure of the conveyor section (e.g., conveyor section 134 as shown). The alignment pins 292 in the alignment holes 290 secure the cover 264 to the conveyor section. The kicker roller (e.g., 262 as shown) rotates about an axle 293 that seats in a collar 291 attached to the inner surface of the cover 264. In this way, the rollers (e.g., 138, 139, 262, 274, 276, 280, 284) are rotatably secured to the object processing system at both ends thereof.

Figure 35:
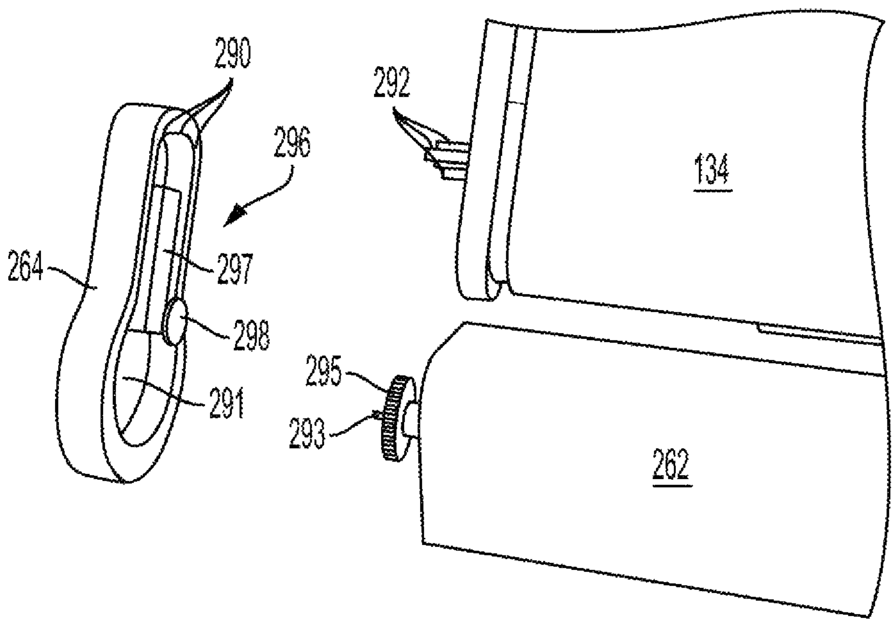
FIG. 35 shows an illustrative diagrammatic view of a drive system for the kicker roller of the mobile system of FIG. 3 in which the drive system includes drive motors coupled to the kicker rollers.

The kicker rollers (e.g., 138, 139, 262, 274, 276, 280, 284) may be driven from a conveyor section (as shown in FIG. 34) or may be driven by a separate drive system (as shown in FIG. 35). In particular, FIG. 34 shows a belt drive system 294 that connects a first drive wheel 299 that is coupled to a roller of the conveyor section 234 to a second drive wheel 295 that drives the kicker roller 262. The wheels 299, 295 may be different sizes, permitting the kicker roller to rotate at different speeds than the roller of the conveyor section 234. The cover 264 includes a recessed region that covers the belt drive system 294.

FIG. 35 shows a motor drive system 296 within the cover 264. Again, the alignment pins 292 in the alignment holes 290 secure the cover 264 to the conveyor section. The kicker roller (e.g., 262 as shown) rotates about the axle 293 that seats in the collar 291 attached to the inner surface of the cover 264. The motor drive system 296 includes a motor 297 and a drive wheel 298 that engages the drive wheel 295 of the roller (e.g., 262 when the cover 264 is placed over the drive wheel 293 and onto the alignment pins 292.

Using either belt drive system of FIG. 34 or the separate motor drive system of FIG. 35, the kicker rollers may be rotated at different speeds and directions than the rollers of adjacent the conveyor sections. Each roller (e.g., 138, 139, 262, 274, 276, 280, 284) may include the drive system at one or both ends of the roller, and each roller includes a cover supporting the roller as discussed above at both ends thereof.

Figure 36:
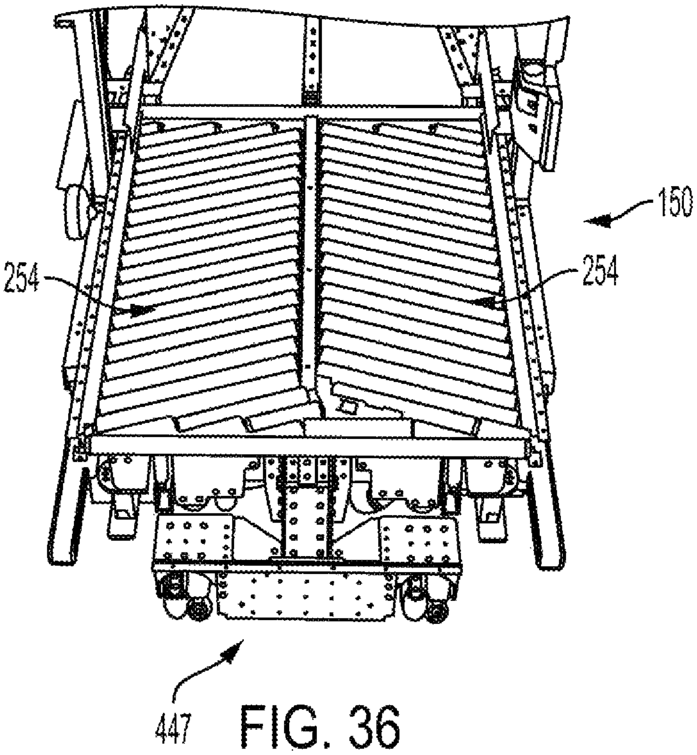
FIG. 36 shows an illustrative diagrammatic view of the transition conveyor system of the object processing system of FIG. 3.

The object processing system 10 may further include a transition conveyor section 150 that includes a pair of herring bone angled conveyor sections 254 that are angled such that objects that are received from the collecting conveyor 140 are moved onto the transition conveyor section 150, moved toward the center of the transition conveyor section 250 by the angled rollers, and then dropped onto the traveling conveyor 210 at a generally central location thereof as shown in FIG. 36. The transition conveyor section 150 may be used with any of the systems discussed above.

Figure 37:
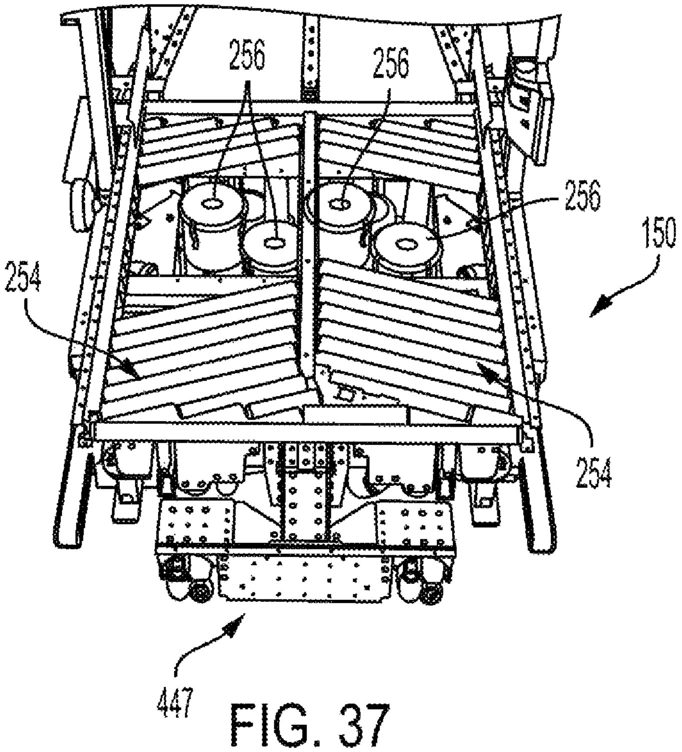
FIG. 37 shows an illustrative diagrammatic cut-away with portions of the transition conveyor system removed showing the vacuum blowers.

Each zone of each end-effector may be coupled to an independent high flow vacuum source such as a blower. FIG. 37 shows four blowers 256 that are coupled to the vacuum ports (e.g., 194, 196 in FIG. 24A) of each of the two end-effectors. The vacuum manifolds of each end-effector are coupled to the blowers via hoses that extend through slidable/rotatable rings on the programmable motion devices 118, 122.

Figure 38A:
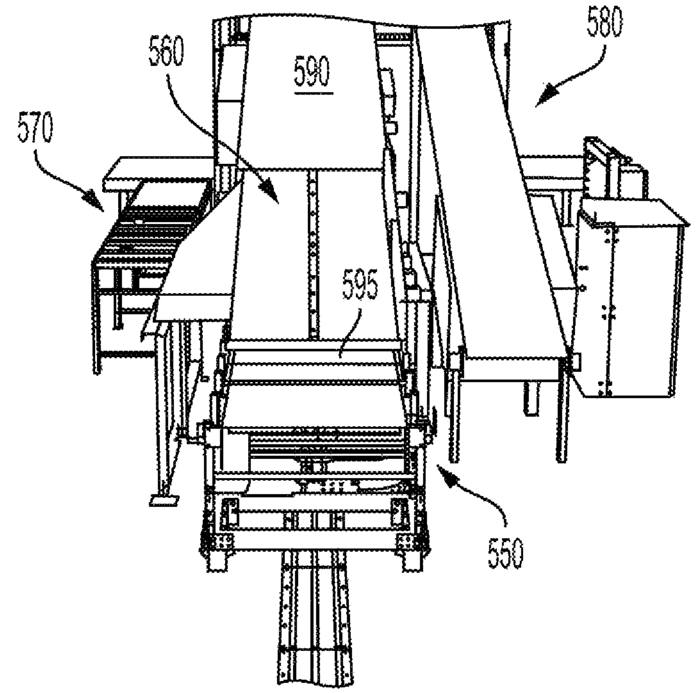
FIGS. 38A and 38B show illustrative diagrammatic views of the receiving conveyor of the object processing system of FIG. 1 showing the receiving conveyor beginning to move (FIG. 38A) and having been moved (FIG. 38B) away from its base toward a trailer.
Figure 38B:
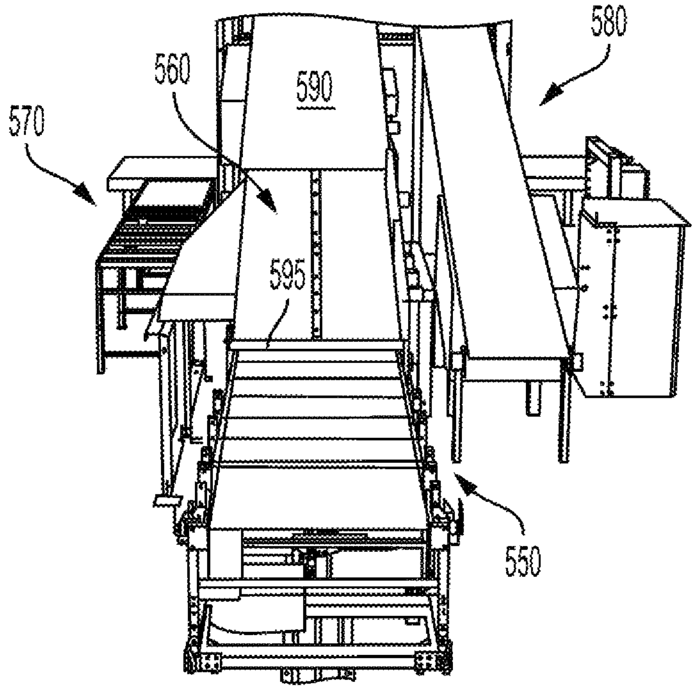

FIGS. 38A and 38 B show views toward the dock end processing system that includes the receiving conveyor 550, showing the receiving conveyor beginning to be extended toward the trailer (FIG. 38A) and further extended toward the trailer (FIG. 38B). Exceptions may be placed on an exceptions conveyor 560, and very small objects may be pulled by human personnel and placed on the small objects conveyor 580. The remaining objects on the collection conveyor are directed toward a facilities conveyor 590.

Figure 39A:
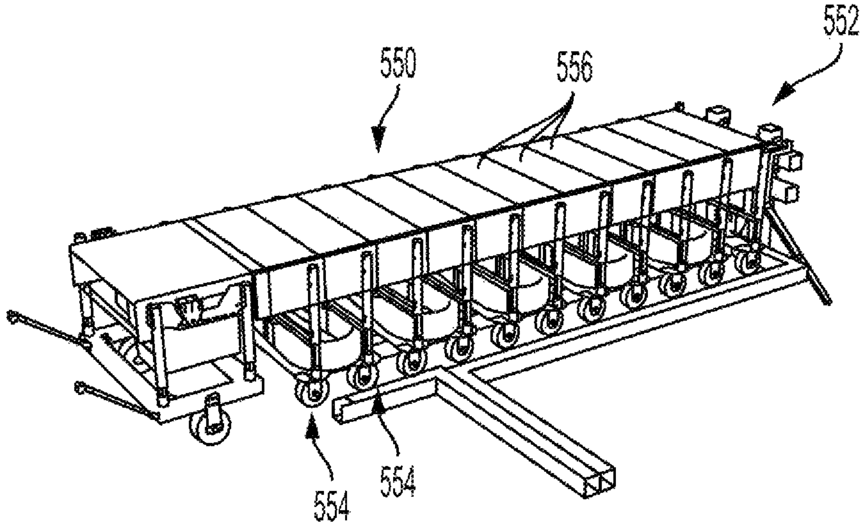
FIGS. 39A-39C show illustrative diagrammatic views of the receiving conveyor of the object processing system of FIG. 1 in a collapsed position (FIG. 39A), partially extended (FIG. 39B) and fully extended (FIG. 39C)
Figure 39B:
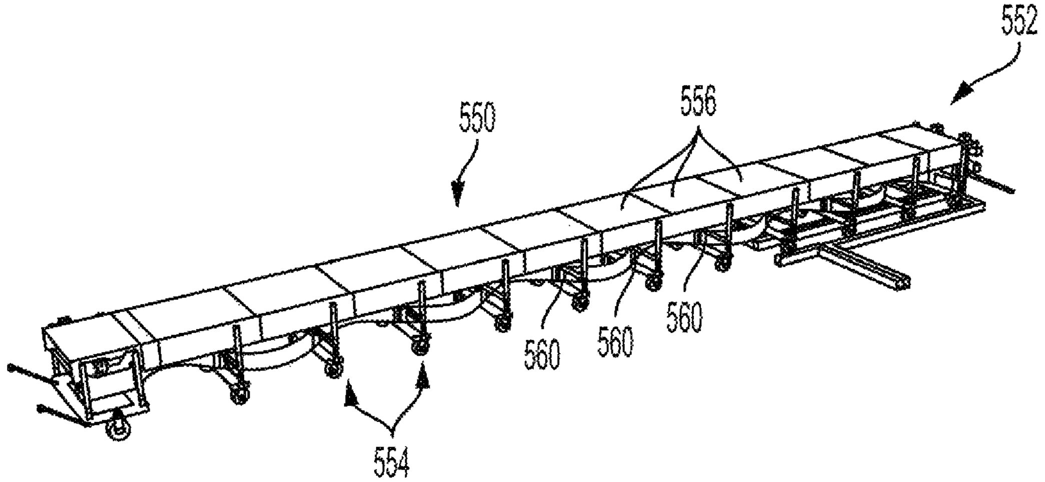
Figure 39C:
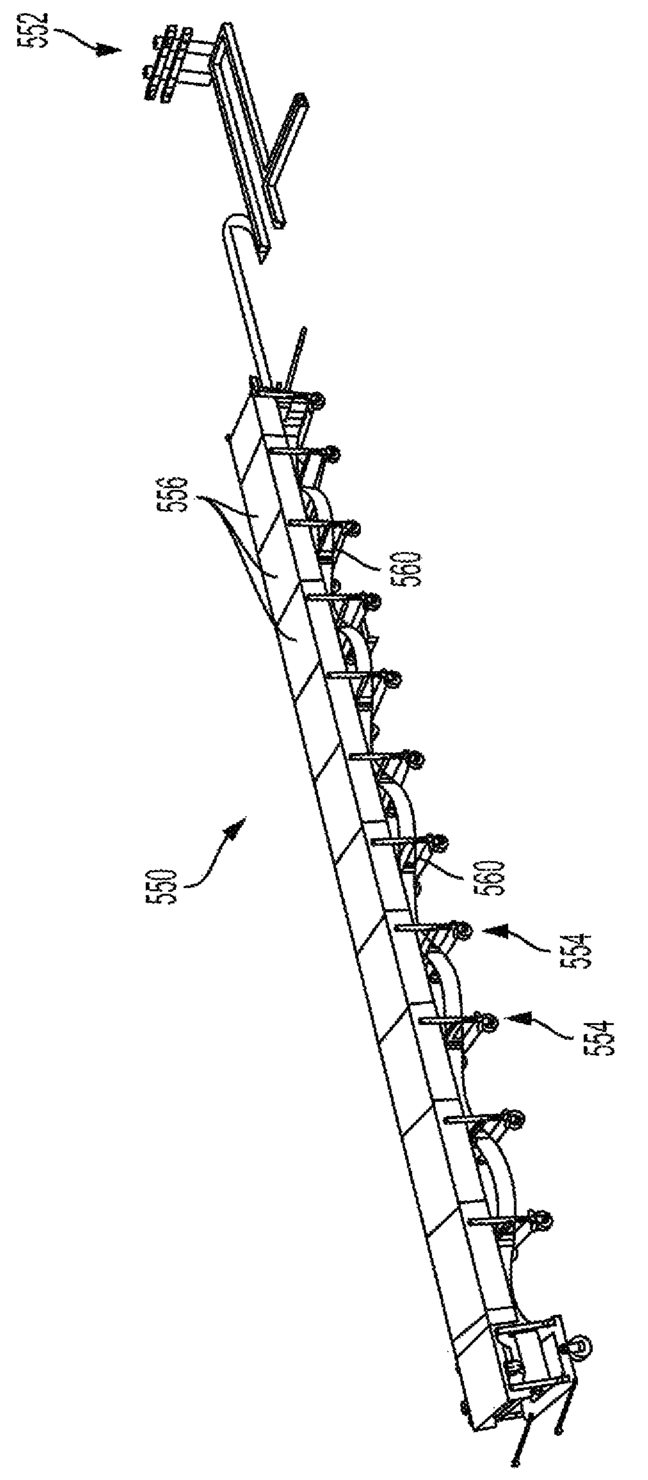

The receiving conveyor 550 expands as it is drawn into the trailer away from its base 552. The receiving conveyor 550 is supported by roller supports 554 that permit the receiving conveyor 550 to expand, and the conveyor surface may be provided by telescoping conveyor sections 556 as shown in FIG. 39A. FIGS. 39B and 39C show the receiving conveyor expanding as it is moved away from its base 552. As the receiving conveyor 550 expands, a utilities conduit (that provides for example electrical power to the mobile assembly) unfolds while supported by accommodating conduit joints 560.

Figure 40:
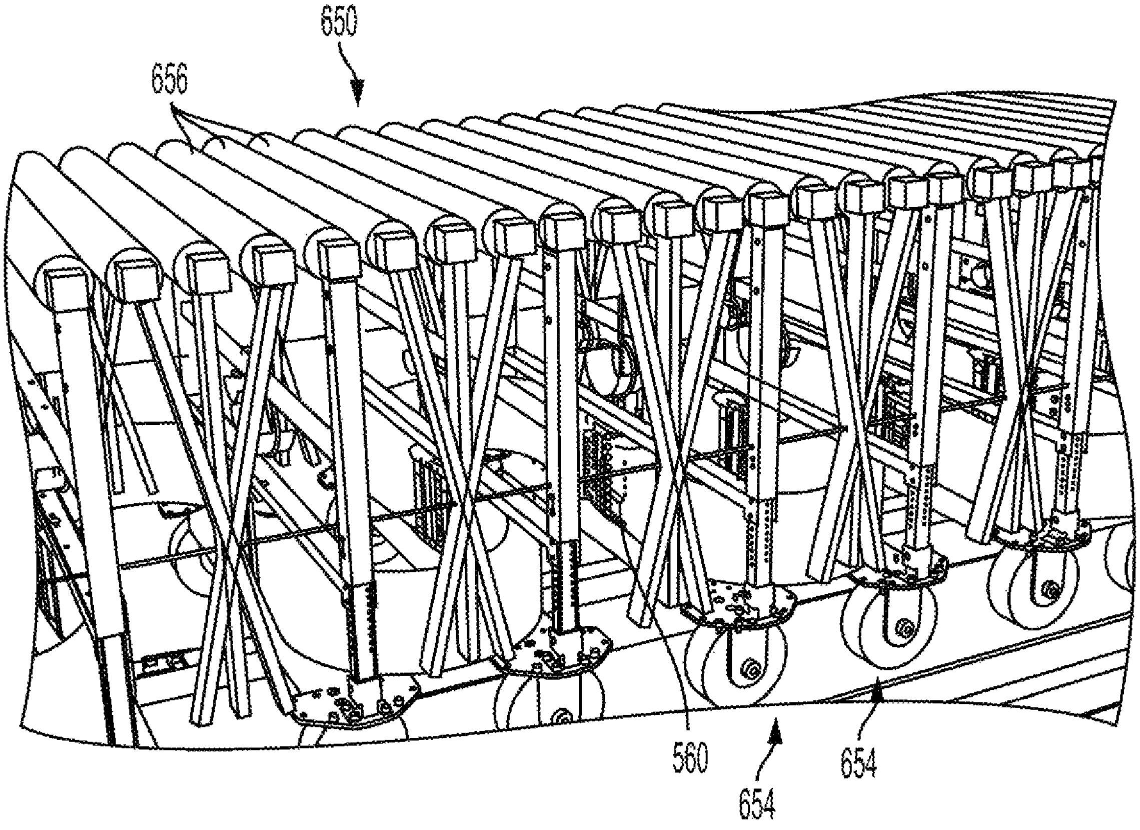
FIG. 40 shows an illustrative diagrammatic view of a receiving conveyor in accordance with another aspect of the present invention.
Figure 41:
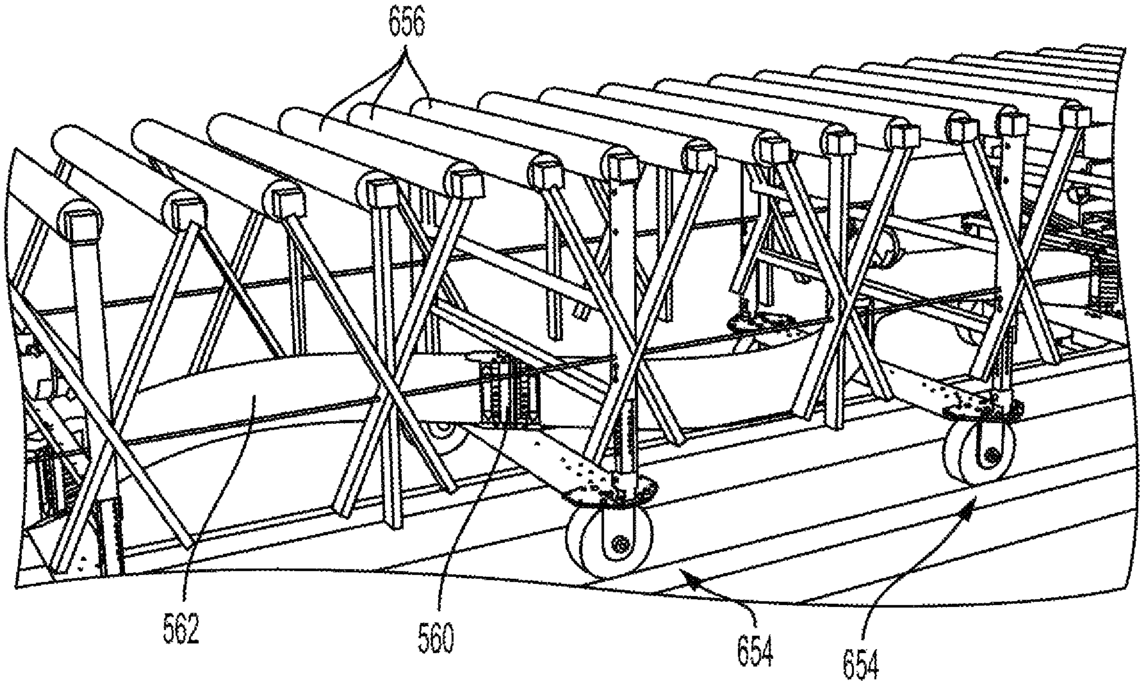
FIG. 41 shows an illustrative diagrammatic view of the receiving conveyor of FIG. 40 in a partially extended position.
Figure 42:
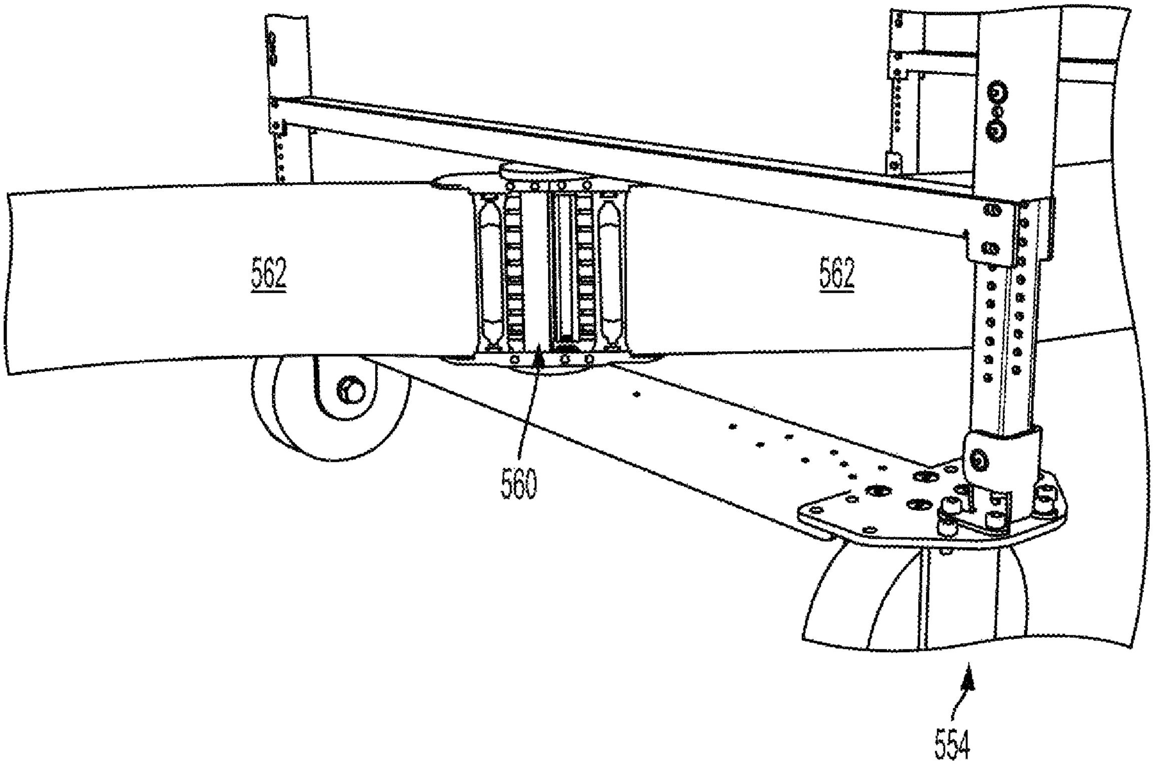
FIG. 42 shows an illustrative diagrammatic view of a utilities conduit in a receiving conveyor in accordance with an aspect of the present invention.

In accordance with a further aspect of the present invention, FIG. 40 shows an expanding receiving conveyor 650 that includes rollers 656 mounted on a structure that includes roller supports 654. Again, as the receiving conveyor 650 expands, the utilities conduit unfolds while supported by the accommodating conduit joints 560. FIG. 41 shows the receiving conveyor 650 of FIG. 40 having become expanded causing the rollers 656 to separate, and providing that the utilities conduit 562 unfolds via the accommodating conduit joints 560. FIG. 42 shows an accommodating conduit joint 560 whereby a utilities conduit is able to pass through the joint 560 while permitting translation of the utilities lines though the joint and permitting rotation of the utilities lines with respect to the roller supports 554.

Figure 43:
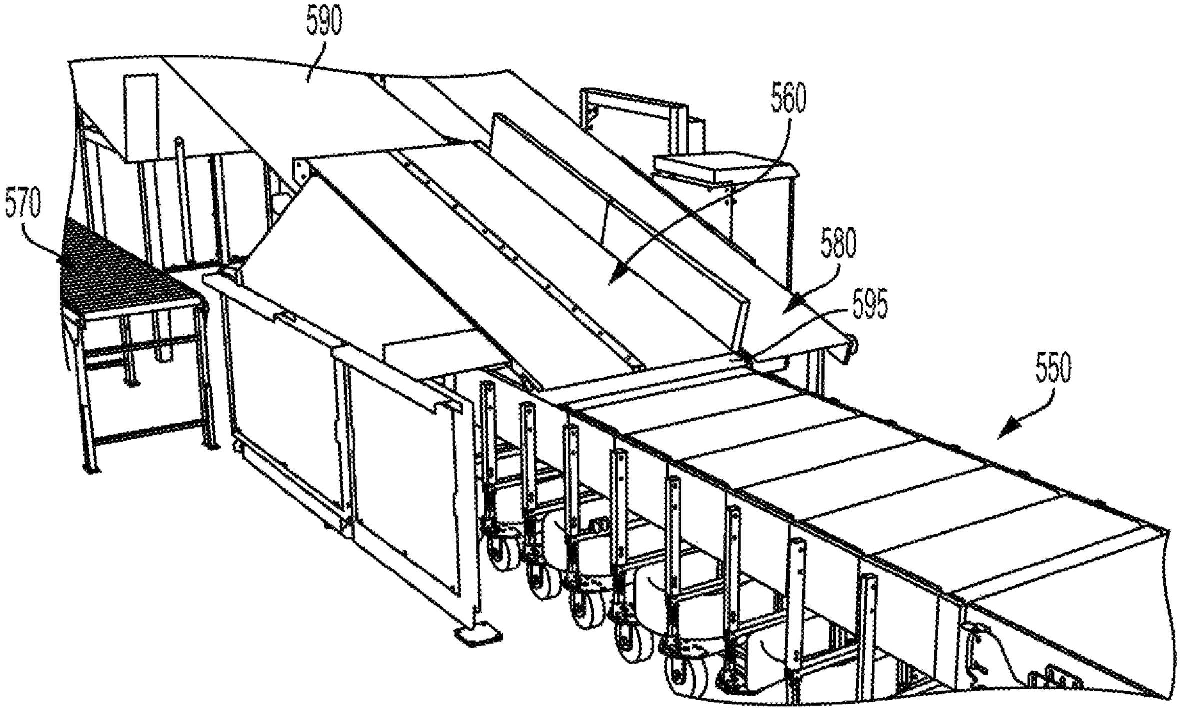
FIG. 43 shows an illustrative diagrammatic view of a collection conveyor system for moving objects from the receiving conveyor to a utilities conveyor in an object processing system in accordance with an aspect of the present invention.

The lower end of the collection conveyor 560 may be positioned close to the receiving conveyor, and optionally may include a knife edge member 595 at the lower end of the collection conveyor 560 as shown in FIG. 43. The knife edge member 595 may be positioned very close to the top surface of the receiving conveyor for facilitating moving objects from the receiving conveyor 550 onto the collection conveyor 560.

Those skilled in the art will appreciate that numerous modifications and variations may be made to the above disclosed embodiments without departing from the spirit and scope of the present invention.

What is claimed is:

1. An object processing system comprising:

a mobile system for moving from a proximal location toward a plurality of objects in a trailer of a tractor trailer, said mobile system including at least one conveyor section for transporting any objects on the at least one conveyor section out of the trailer, the at least one conveyor section including a leading edge at a front end of the mobile system, wherein the leading edge of the front end of the mobile system includes a kicker roller that is separated from the at least one conveyor section and configured to move the plurality of objects onto the at least one conveyor section as the mobile system moves toward the plurality of objects in the trailer; and a pair of front wheel assemblies that each include a pair of wheels mounted on a frame that is pivotally attached to a chassis of the mobile system, wherein each front wheel assembly includes a drive system that is also mounted on the frame such that the pair of front wheel assemblies are pivotable with respect to the chassis while being driven by the drive system.

2. The object processing system of claim 1, wherein the frame of each front wheel assembly generally extends in a direction of travel of the wheels of the front wheel assembly.

3. The object processing system of claim 2, wherein the mobile system includes a rear wheel assembly that includes a pair of rear wheels mounted on a rear frame that is pivotally attached to the chassis.

4. The object processing system of claim 3, wherein the rear frame generally extends in a rear frame direction that is generally transverse to the pair of rear wheels of the rear wheel assembly.

5. The object processing system of claim 4, wherein the rear wheels are each multidirectional wheels.

6. The object processing system of claim 5, wherein the multidirectional wheels are usable to steer the mobile system.

7. The object processing system of claim 1, wherein the front wheel assemblies accommodate elevational variations in a first direction of travel of the front wheel assemblies.

8. The object processing system of claim 1, wherein the mobile system further includes a plurality of passive wheels under the at least one conveyor section that facilitate maintaining the leading edge of the front end of the mobile system from contacting a floor of the trailer.

9. The object processing system of claim 1, wherein the object processing system further includes a perception system for providing perception data to facilitate movement of the mobile system into and out of the trailer.

10. An object processing system comprising:

a mobile system for moving from a proximal location toward a plurality of objects in a trailer of a tractor trailer, said mobile system including at least one conveyor section for transporting any objects on the at least one conveyor section out of the trailer, the at least one conveyor section including a leading edge at a front end of the mobile system, wherein the leading edge of the front end of the mobile system includes a kicker roller that is separated from the at least one conveyor section and configured to move the plurality of objects onto the at least one conveyor section as the mobile system moves toward the plurality of objects in the trailer; and a pair of front wheel assemblies that each pivot about a front wheel axis that is generally transverse to a direction of movement of the front wheel assemblies, and a rear wheel assembly that pivots about a rear wheel axis that is generally parallel to the direction of movement of the front wheel assemblies.

11. The object processing system of claim 10, wherein each front wheel assembly is mounted to a front frame that generally extends in a direction of travel of the wheels of the front wheel assembly.

12. The object processing system of claim 11, wherein the rear wheel assembly includes a pair of rear wheels mounted on a rear frame that is pivotally attached to the chassis.

13. The object processing system of claim 12, wherein the rear frame generally extends in a rear frame direction that is generally transverse to the pair of rear wheels of the rear wheel assembly.

14. The object processing system of claim 13, wherein the rear wheels are each multidirectional wheels.

15. The object processing system of claim 14, wherein the multidirectional wheels are usable to steer the mobile system.

16. The object processing system of claim 10, wherein the front wheel assemblies accommodate elevational variations in a first direction of travel of the front wheel assemblies.

17. The object processing system of claim 10, wherein the mobile system further includes a plurality of passive wheels under the at least one conveyor section that facilitate maintaining the leading edge of the front end of the mobile system from contacting a floor of the trailer.

18. The object processing system of claim 10, wherein the object processing system further includes a perception system for providing perception data to facilitate movement of the mobile system into and out of the trailer.

19. A method of processing object comprising:

moving a mobile system from a proximal location toward a plurality of objects in a trailer of a tractor trailer along a first direction, said mobile system including at least one conveyor section for transporting any objects on the at least one conveyor section out of the trailer, the at least one conveyor section including a leading edge at a front end of the mobile system as the mobile system moves toward the collection of objects in the trailer;

pivoting a pair of front wheel assemblies, each front wheel assembly being pivotable about an axis that is generally transverse to the first direction; and pivoting a rear wheel assembly about an axis that is generally parallel with the first direction.

20. The method of claim 19, wherein each front wheel assembly is mounted to a front frame that generally extends in a direction of travel of the wheels of the front wheel assembly.

21. The method of claim 20, wherein the rear wheel assembly includes a pair of rear wheels mounted on a rear frame that is pivotally attached to the chassis.

22. The method of claim 21, wherein the rear frame generally extends in a rear frame direction that is generally transverse to the first direction.

23. The method of claim 22, wherein the rear wheels are each multidirectional wheels.

24. The method of claim 23, wherein the method includes steering the mobile system with the multidirectional wheels.

25. The method of claim 19, wherein the front wheel assemblies accommodate elevational variations in a first direction of travel of the front wheel assemblies.

26. The method of claim 19, wherein the mobile system further includes a plurality of passive wheels under the at least one conveyor section that facilitate maintaining the leading edge of the front end of the mobile system from contacting a floor of the trailer.

27. The method of claim 19, wherein the leading edge of the front end of the mobile system includes a kicker roller that is separated from the at least one conveyor section, the kicker roller facilitating moving the plurality of objects onto the at least one conveyor section.

28. The method of claim 19, wherein the object processing system further includes a perception system for providing perception data to facilitate movement of the mobile system into and out of the trailer.

29. An object processing system comprising:

a mobile system for moving from a proximal location toward a plurality of objects in a trailer of a tractor trailer, said mobile system including at least one conveyor section for transporting any objects on the at least one conveyor section out of the trailer, the at least one conveyor section including a leading edge at a front end of the mobile system as the mobile system moves toward the plurality of objects in the trailer;

a pair of front wheel assemblies that each include a pair of wheels mounted on a frame that is pivotally attached to a chassis of the mobile system, wherein each front wheel assembly includes a drive system that is also mounted on the frame such that the pair of front wheel assemblies are pivotable with respect to the chassis while being driven by the drive system; and a perception system for providing perception data to facilitate movement of the mobile system into and out of the trailer.

30. The object processing system of claim 29, wherein the frame of each front wheel assembly generally extends in a direction of travel of the wheels of the front wheel assembly.

31. The object processing system of claim 30, wherein the mobile system includes a rear wheel assembly that includes a pair of rear wheels mounted on a rear frame that is pivotally attached to the chassis.

32. The object processing system of claim 31, wherein the rear frame generally extends in a rear frame direction that is generally transverse to the pair of rear wheels of the rear wheel assembly.

33. The object processing system of claim 32, wherein the rear wheels are each multidirectional wheels.

34. The object processing system of claim 33, wherein the multidirectional wheels are usable to steer the mobile system.

35. The object processing system of claim 29, wherein the front wheel assemblies accommodate elevational variations in a first direction of travel of the front wheel assemblies.

36. The object processing system of claim 29, wherein the mobile system further includes a plurality of passive wheels under the at least one conveyor section that facilitate maintaining the leading edge of the front end of the mobile system from contacting a floor of the trailer.

37. The object processing system of claim 29, wherein the leading edge of the front end of the mobile system includes a kicker roller that is separated from the at least one conveyor section, the kicker roller facilitating moving the plurality of objects onto the at least one conveyor section.

38. An object processing system comprising:

a mobile system for moving from a proximal location toward a plurality of objects in a trailer of a tractor trailer, said mobile system including at least one conveyor section for transporting any objects on the at least one conveyor section out of the trailer, the at least one conveyor section including a leading edge at a front end of the mobile system as the mobile system moves toward the plurality of objects in the trailer;

a pair of front wheel assemblies that each pivot about a front wheel axis that is generally transverse to a direction of movement of the front wheel assemblies, and a rear wheel assembly that pivots about a rear wheel axis that is generally parallel to the direction of movement of the front wheel assemblies; and a perception system for providing perception data to facilitate movement of the mobile system into and out of the trailer.

39. The object processing system of claim 38, wherein each front wheel assembly is mounted to a front frame that generally extends in a direction of travel of the wheels of the front wheel assembly.

40. The object processing system of claim 39, wherein the rear wheel assembly includes a pair of rear wheels mounted on a rear frame that is pivotally attached to the chassis.

41. The object processing system of claim 40, wherein the rear frame generally extends in a rear frame direction that is generally transverse to the pair of rear wheels of the rear wheel assembly.

42. The object processing system of claim 41, wherein the rear wheels are each multidirectional wheels.

43. The object processing system of claim 42, wherein the multidirectional wheels are usable to steer the mobile system.

44. The object processing system of claim 38, wherein the front wheel assemblies accommodate elevational variations in a first direction of travel of the front wheel assemblies.

45. The object processing system of claim 38, wherein the mobile system further includes a plurality of passive wheels under the at least one conveyor section that facilitate maintaining the leading edge of the front end of the mobile system from contacting a floor of the trailer.

46. The object processing system of claim 38, wherein the leading edge of the front end of the mobile system includes a kicker roller that is separated from the at least one conveyor section, the kicker roller facilitating moving the plurality of objects onto the at least one conveyor section.

* * * * *